Aug. 11, 1953     W. F. FRASER     2,648,175
CONTROL MEANS FOR AUTOMATIC GRINDING MACHINES
Original Filed Dec. 28, 1946     20 Sheets-Sheet 9
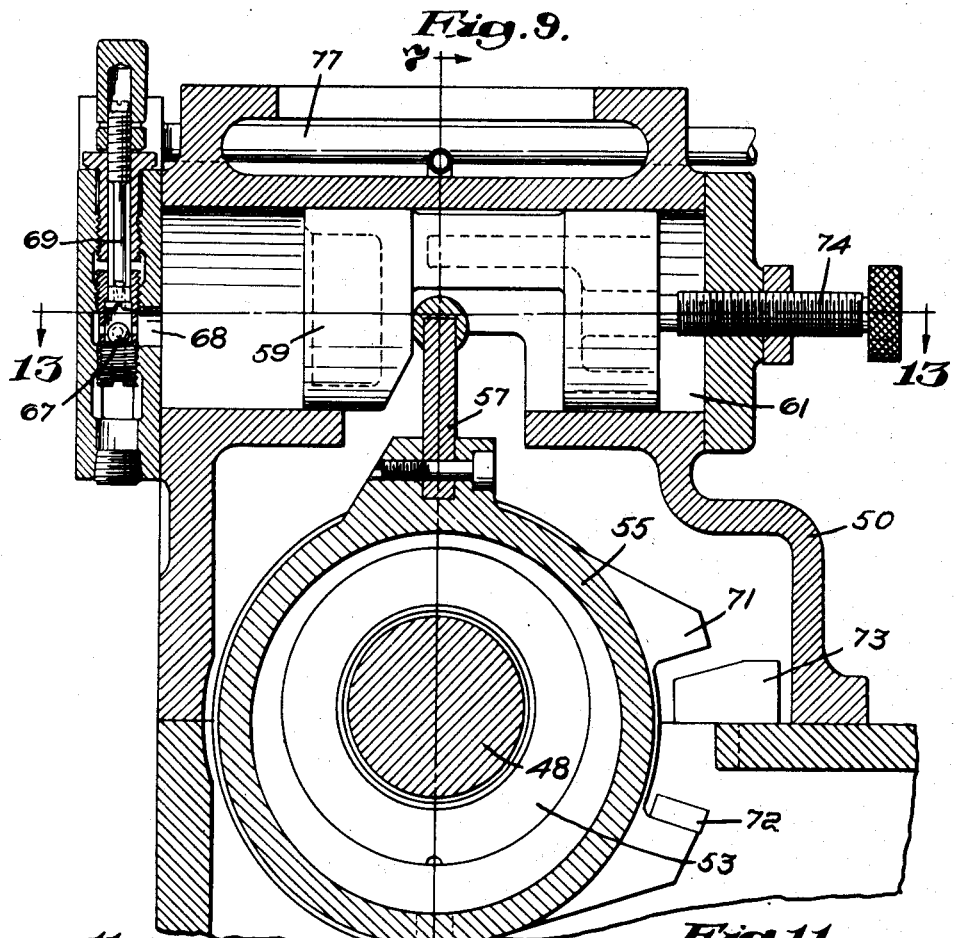
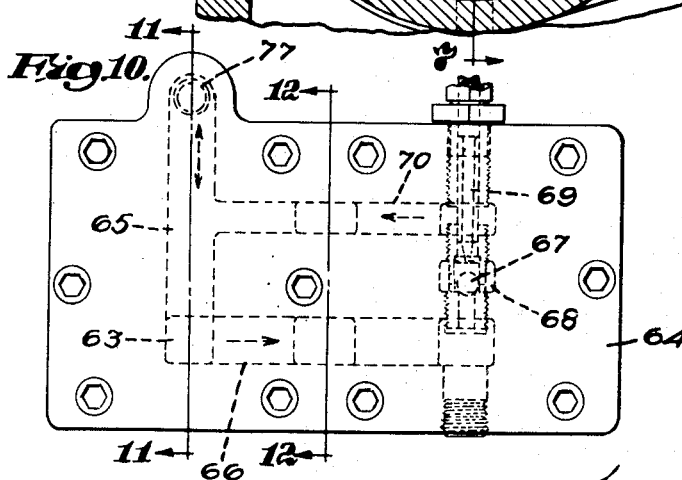
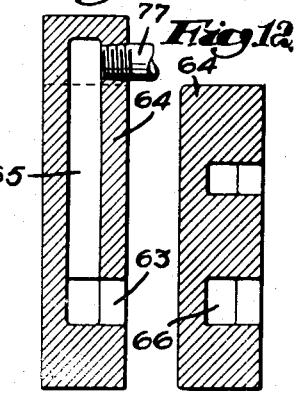
Inventor:
Warren F. Fraser,
by
Attorney.

Aug. 11, 1953 W. F. FRASER 2,648,175
CONTROL MEANS FOR AUTOMATIC GRINDING MACHINES
Original Filed Dec. 28, 1946 20 Sheets-Sheet 10
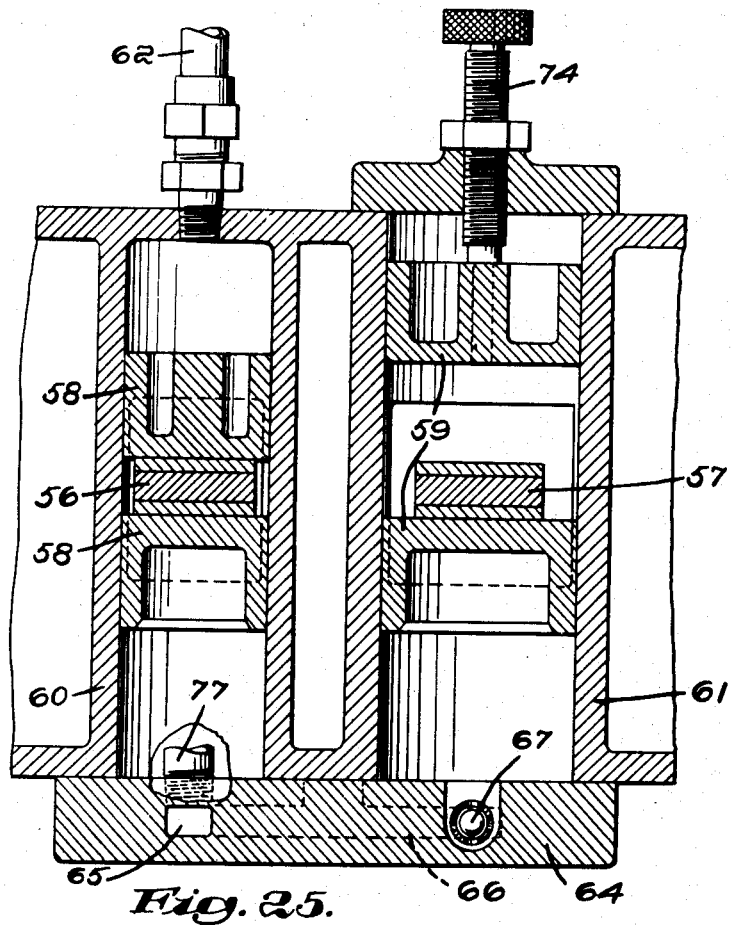
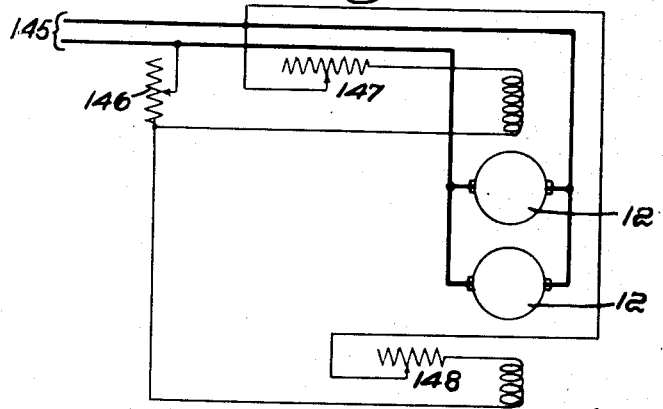

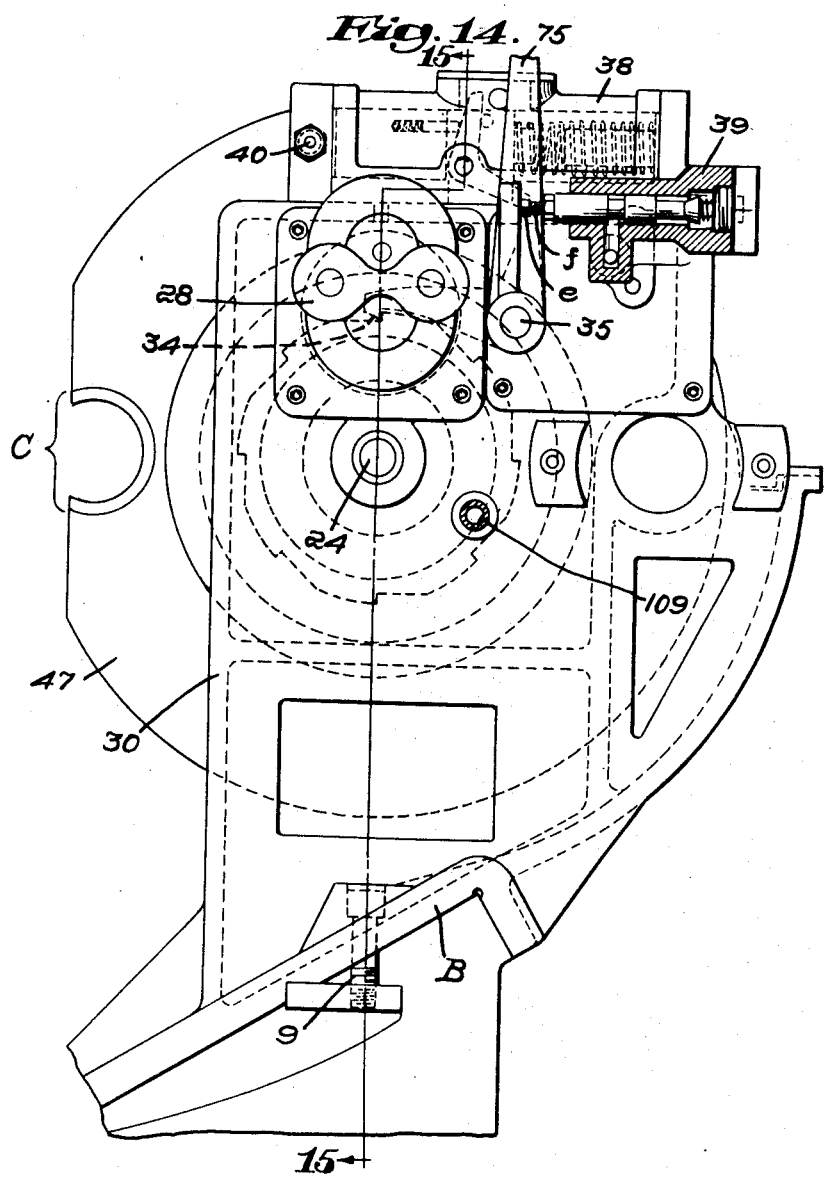

Aug. 11, 1953 W. F. FRASER 2,648,175
CONTROL MEANS FOR AUTOMATIC GRINDING MACHINES
Original Filed Dec. 28, 1946 20 Sheets-Sheet 12
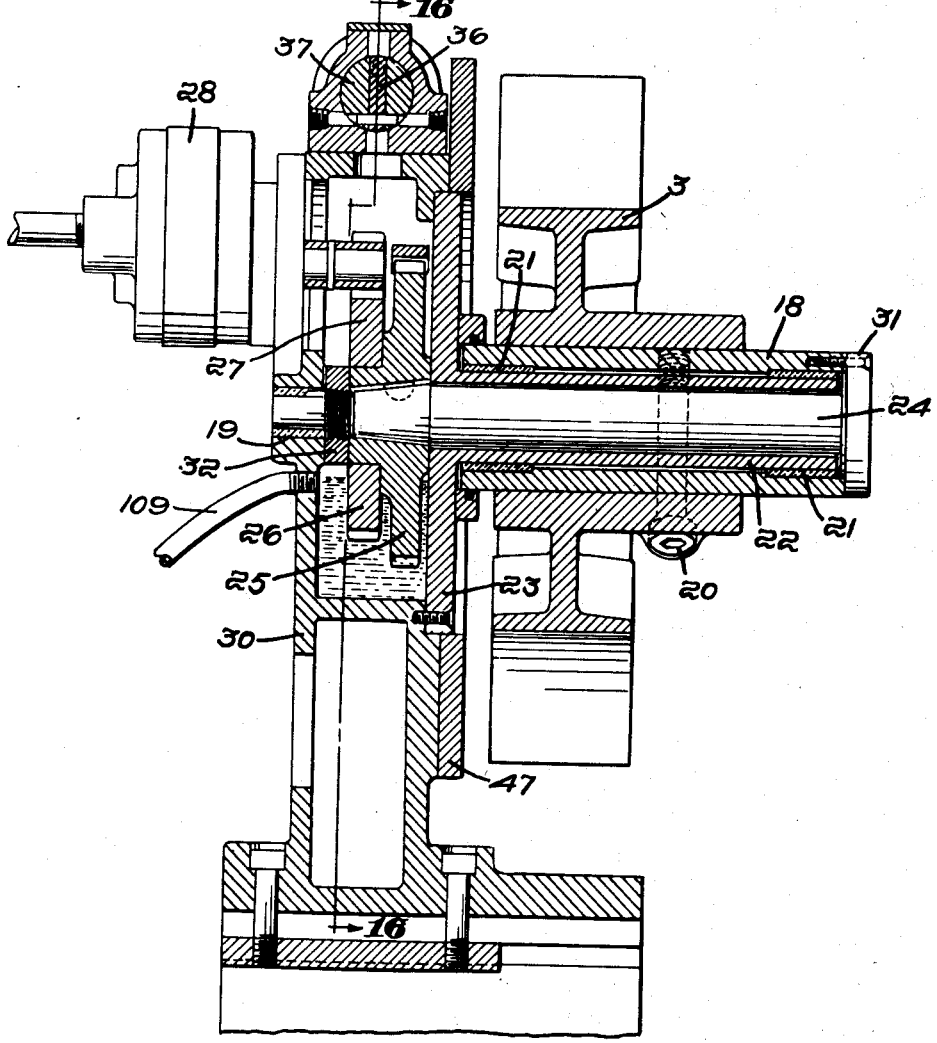

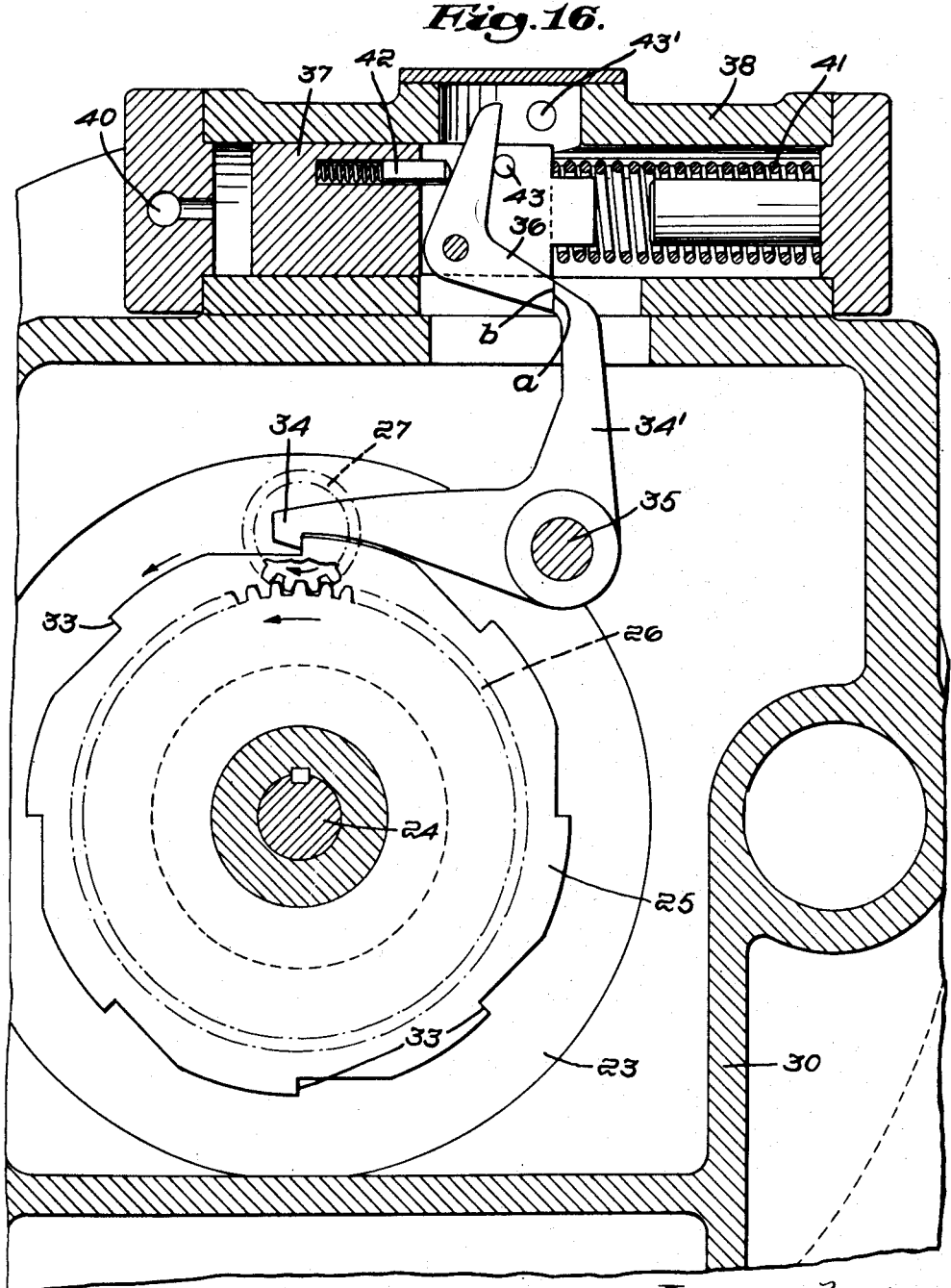

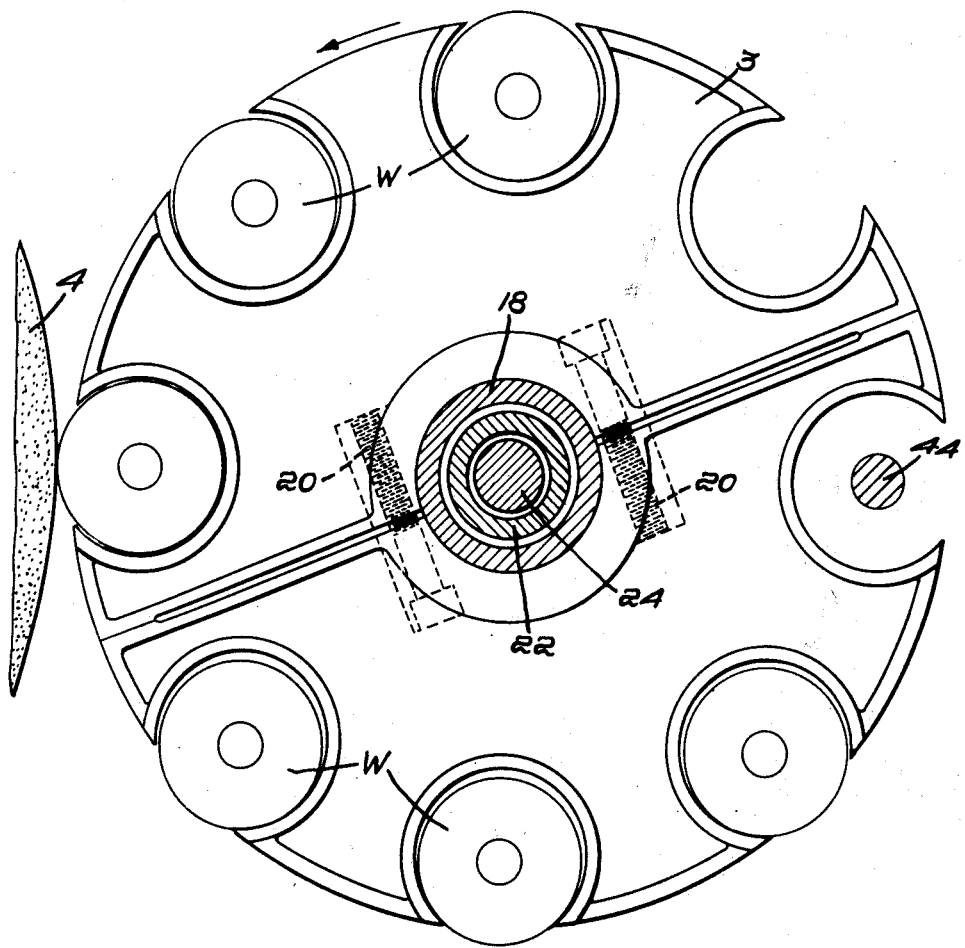

Aug. 11, 1953 W. F. FRASER 2,648,175
CONTROL MEANS FOR AUTOMATIC GRINDING MACHINES
Original Filed Dec. 28, 1946 20 Sheets-Sheet 15

Inventor:
Warren F. Fraser,
by Munn W. Hamilton
Attorney

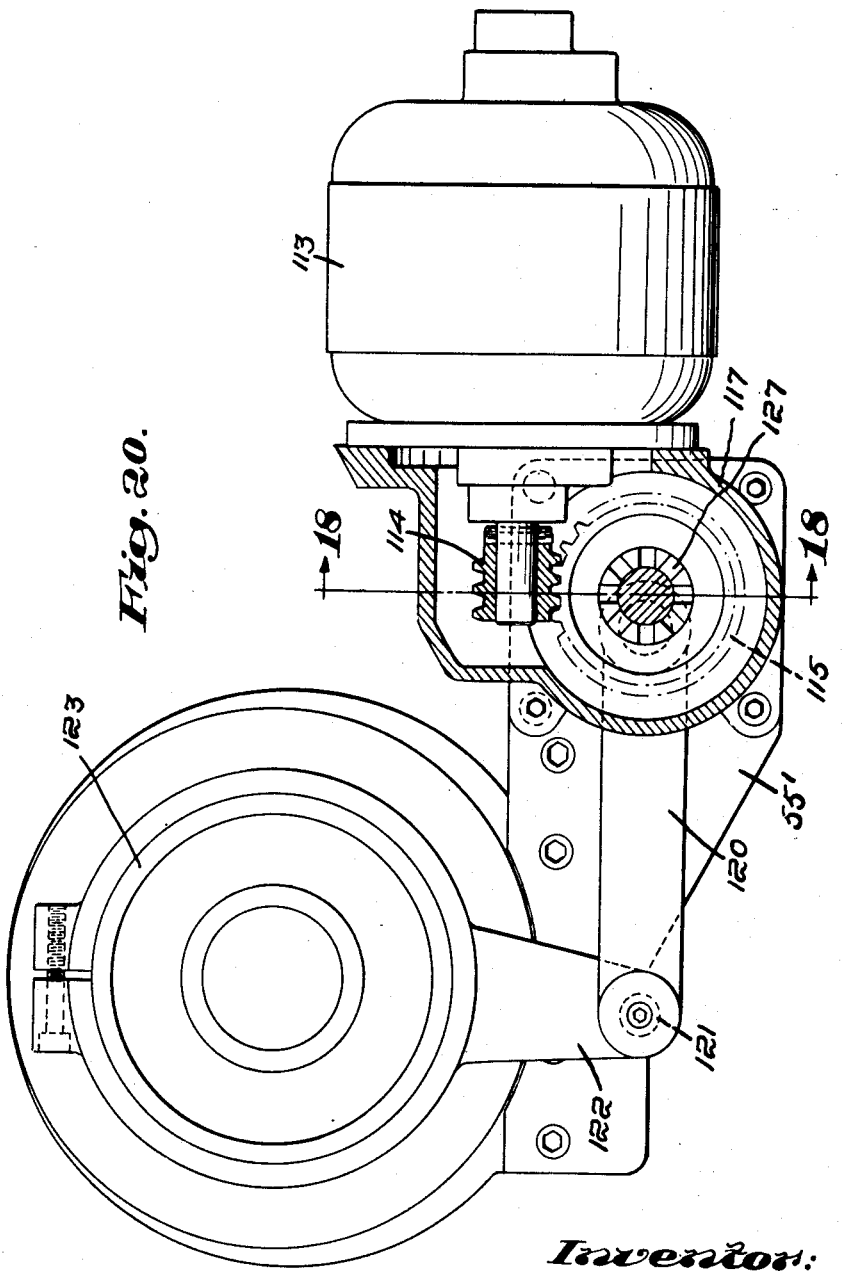

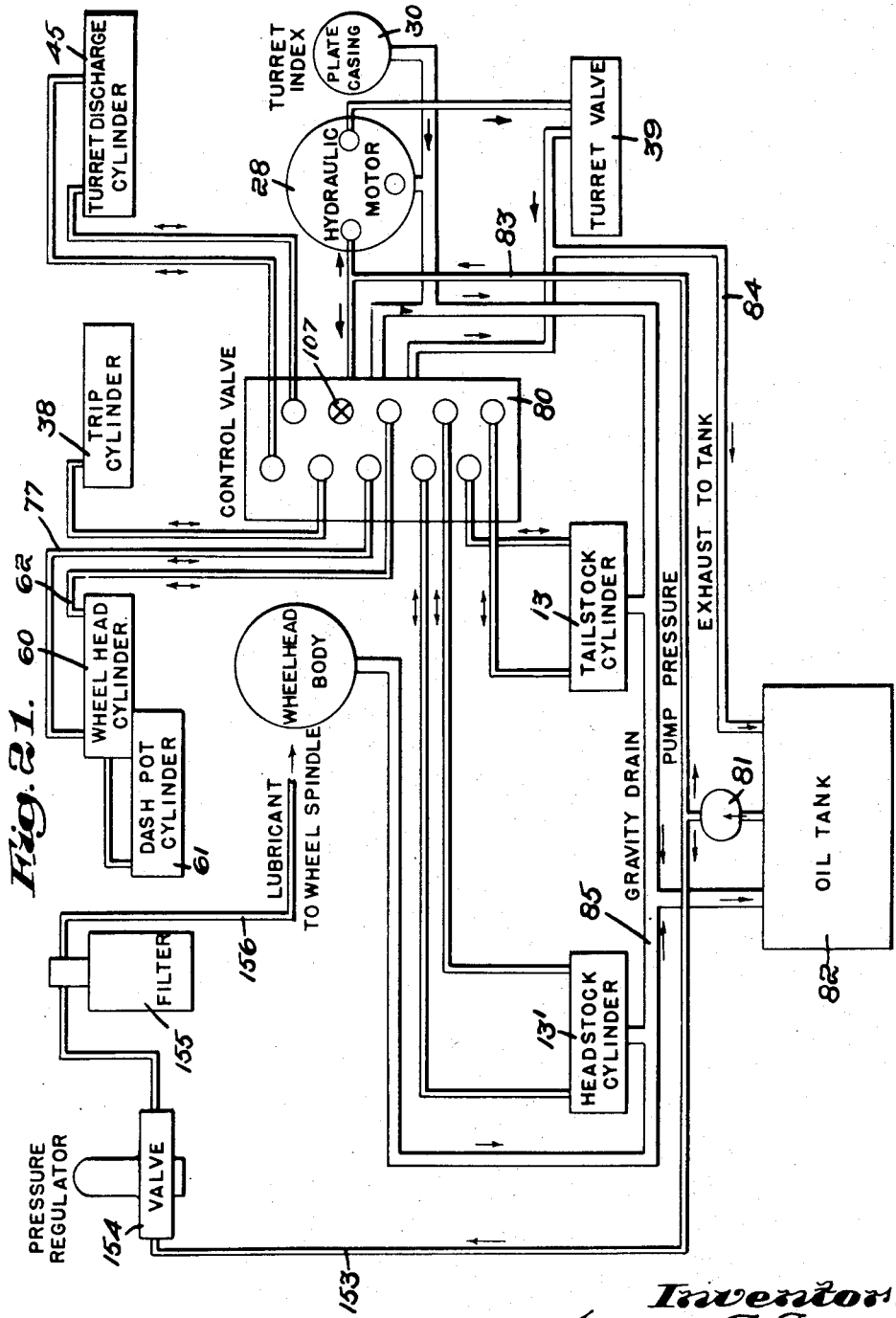

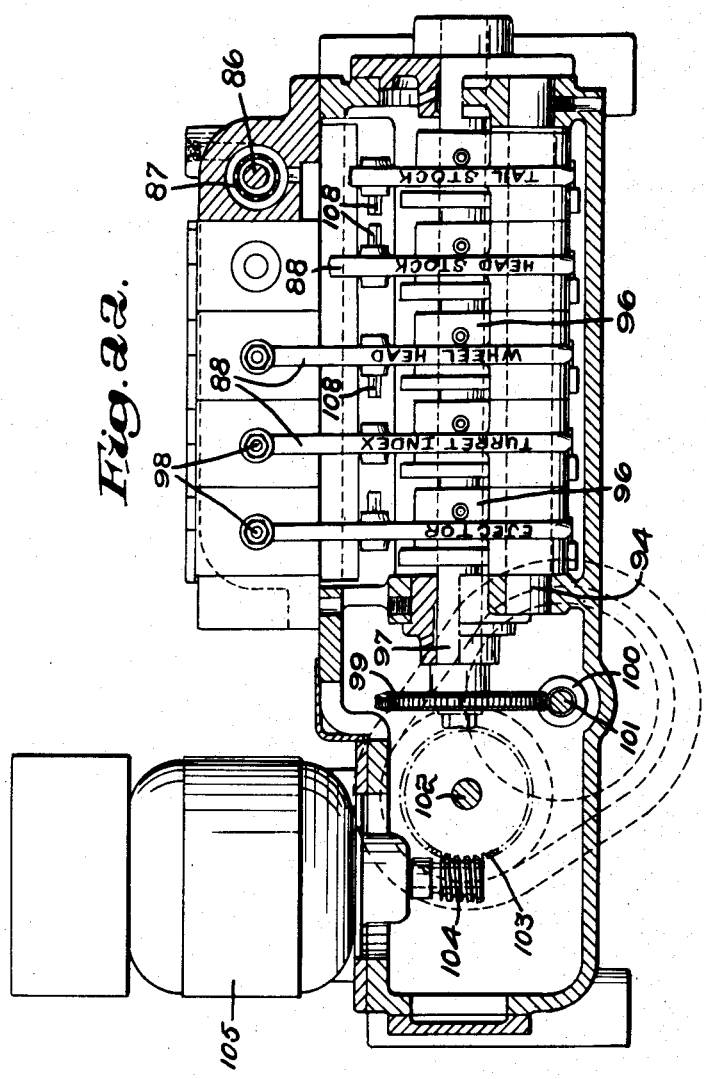

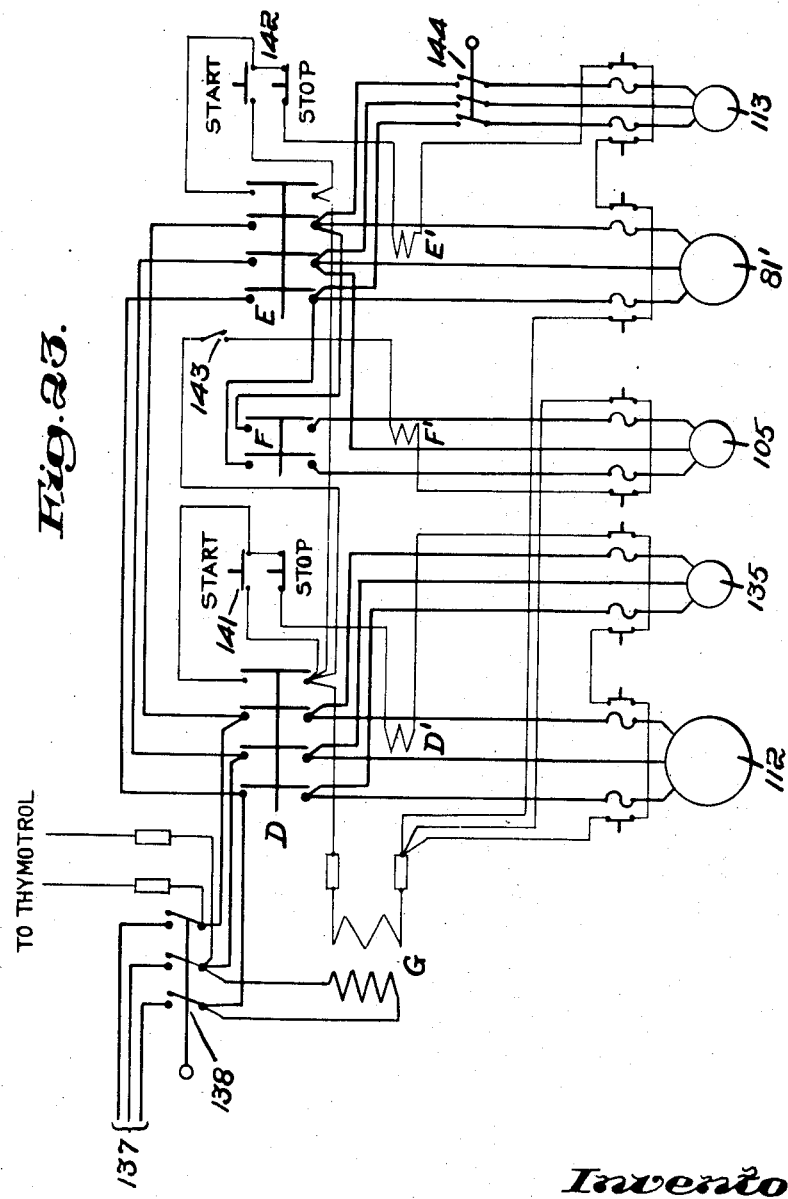

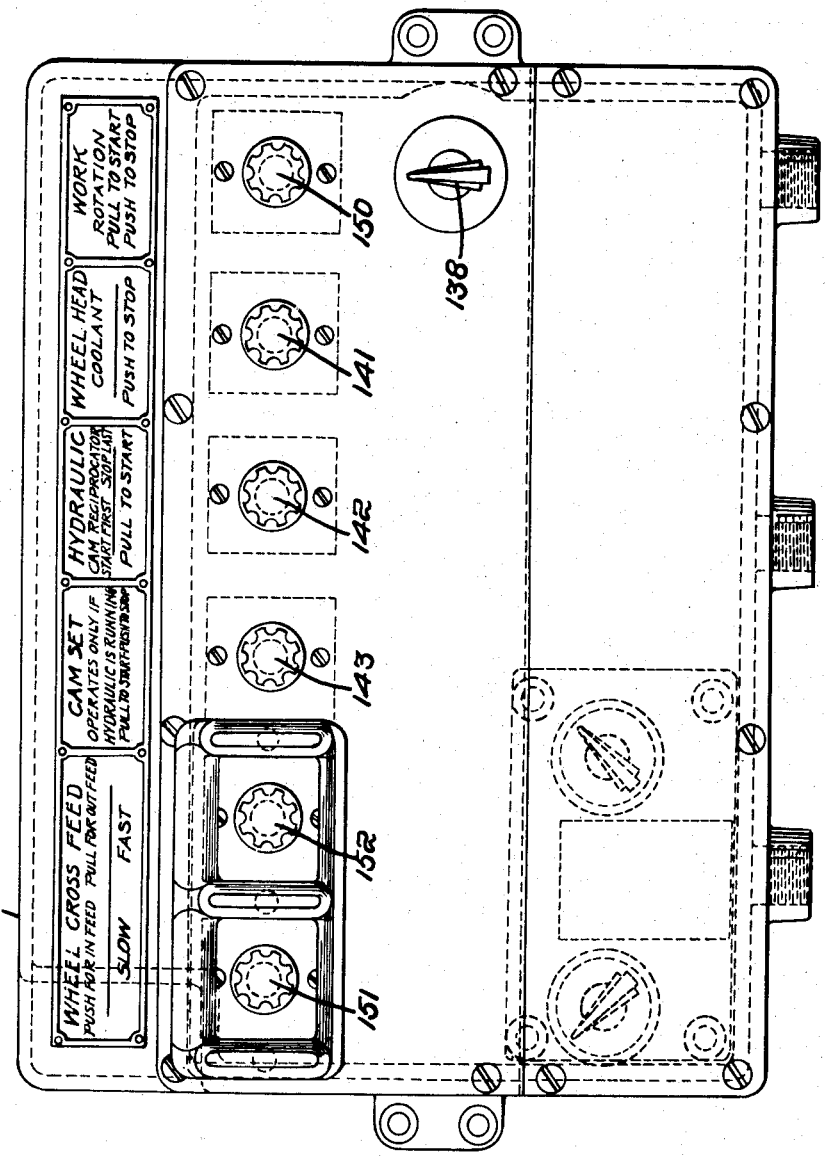

Patented Aug. 11, 1953

2,648,175

UNITED STATES PATENT OFFICE 2,648,175

CONTROL MEANS FOR AUTOMATIC GRINDING MACHINES

Warren F. Fraser, Westboro, Mass.; Ella M. Fraser, administratrix of said Warren F. Fraser, deceased Original application December 28, 1946, Serial No. 719,072, now Patent No. 2,517,193, dated August 1, 1950. Divided and this application February 28, 1950, Serial No. 146,761

8 Claims. (Cl. 51—108)

This invention relates to grinding machines, and is more especially concerned with those machines designed particularly to grind bushings, pins, rolls, and various other articles having cylindrical or tapered exterior surfaces.

Machines are now available for performing these grinding operations automatically on work of this general character, and they include mechanism for presenting such an article of work to a pair of work-holders which grasp it and support it for the grinding operation and later are operated to release it. In these machines mechanism also is provided to move the grinding wheel toward and from the work and to perform other operations which are essential in accomplishing the objects for which these machines are designed. In them, however, the automatic operaations have been heretofore produced mainly, and usually exclusively, by mechanical means, and the relative timing of the different functions and their proper correlation with each other, has been controlled mechanically from a main shaft which not only is used to perform this timing operation, but has also been utilized to drive the various collateral or subsidiary mechanisms. This fact of relying on mechanical means for performing the various functions has necessarily resulted in complicated machine structures, expensive to manufacture and to maintain.

The present invention involves a different approach to the manufacture of machines of this nature, with the object of simplifying the construction and general organization of such machines; reducing the expense of manufacture of them; producing a higher degree of accuracy; relieving the operator of some of the duties required of him in manipulating such machines, and providing greater flexibility in the manufacture of these machines and in the nature of the work which they are capable of handling.

Stated more specifically, the present invention aims to devise a machine of the general character above referred to in which the various units will be operated by prime movers or power sources individual to themselves; the main shaft will be eliminated; control of the various functions will be concentrated at a single control area; and the controlling operations themselves will be produced primarily by operating push-buttons, switches, or the like.

The nature of the invention will be readily understood from the following description when read in connection with the accompanying drawings, and the novel features will be particularly pointed out in the appended claims.

Figure 7:
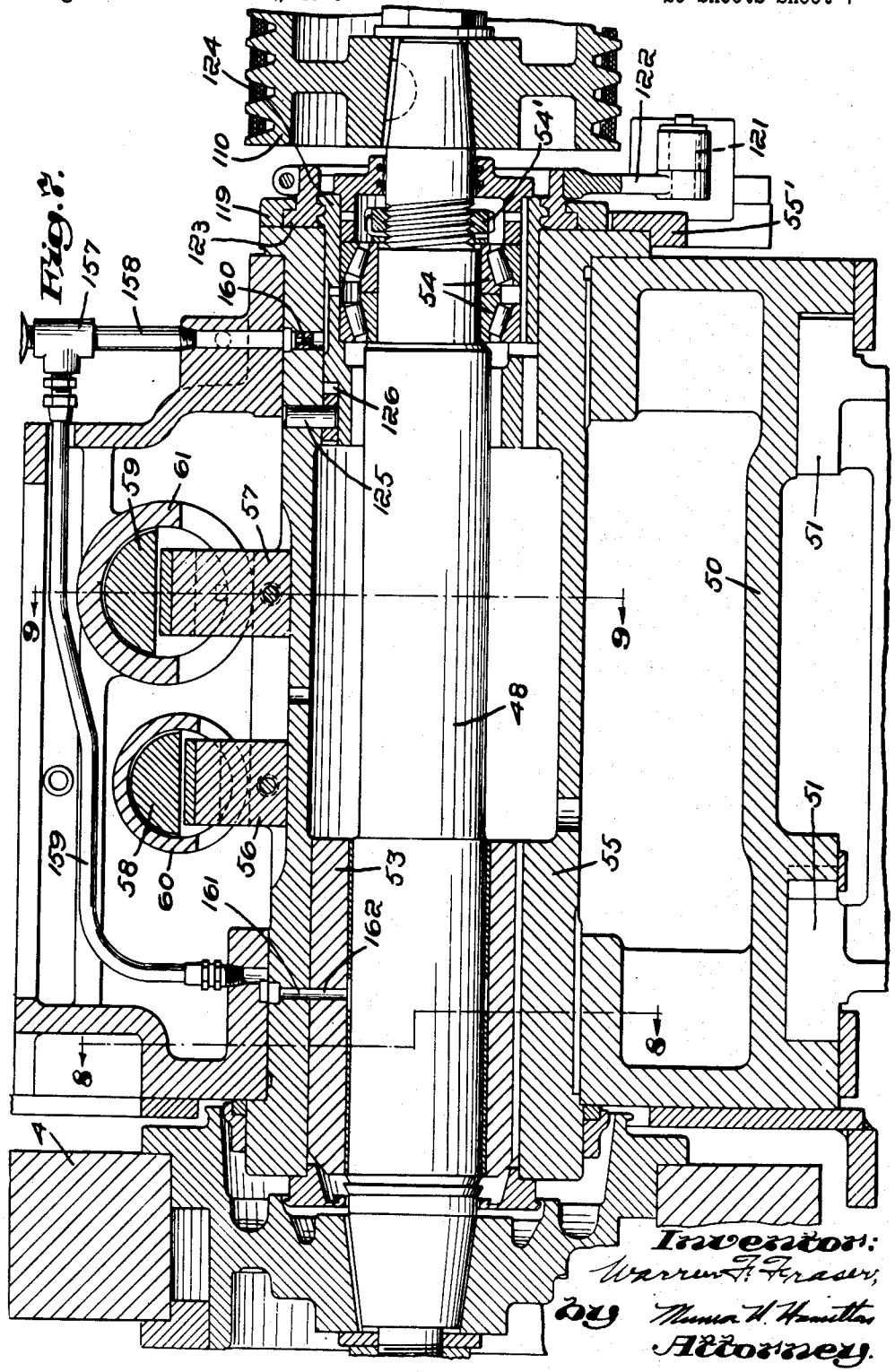
Fig. 7 is a vertical, sectional view taken approximately through the axis of the grinding wheel but illustrating some parts in elevation.
Figure 8:
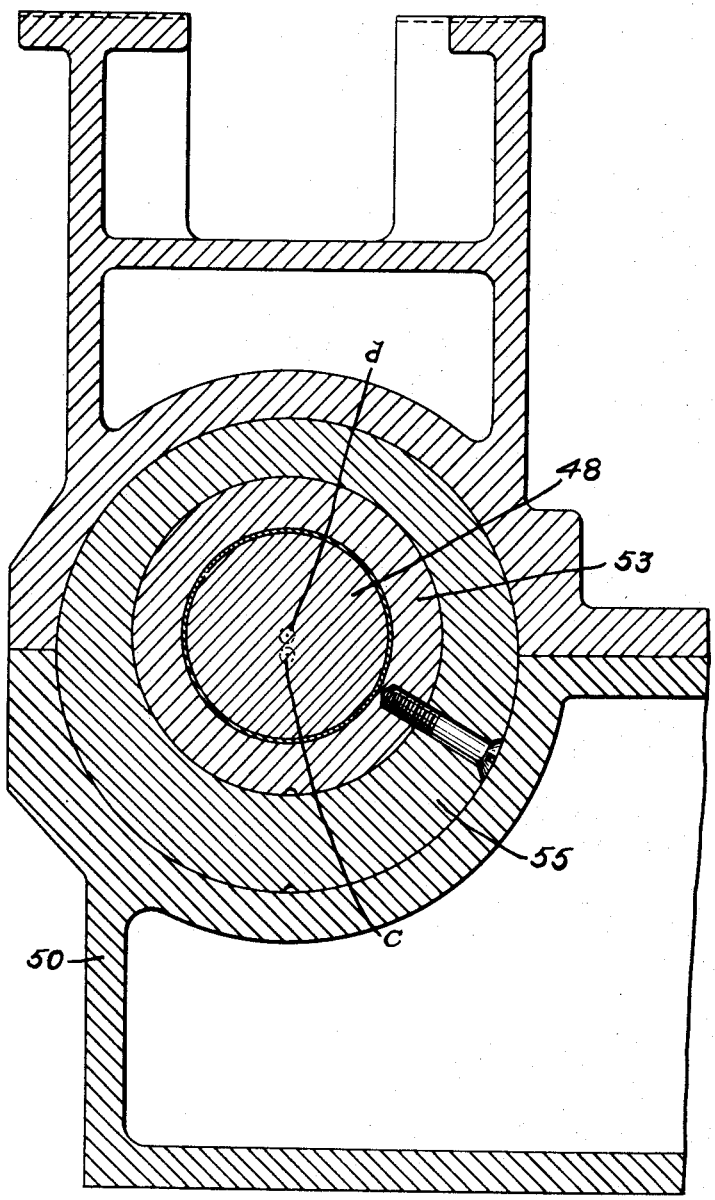
Figure 18:
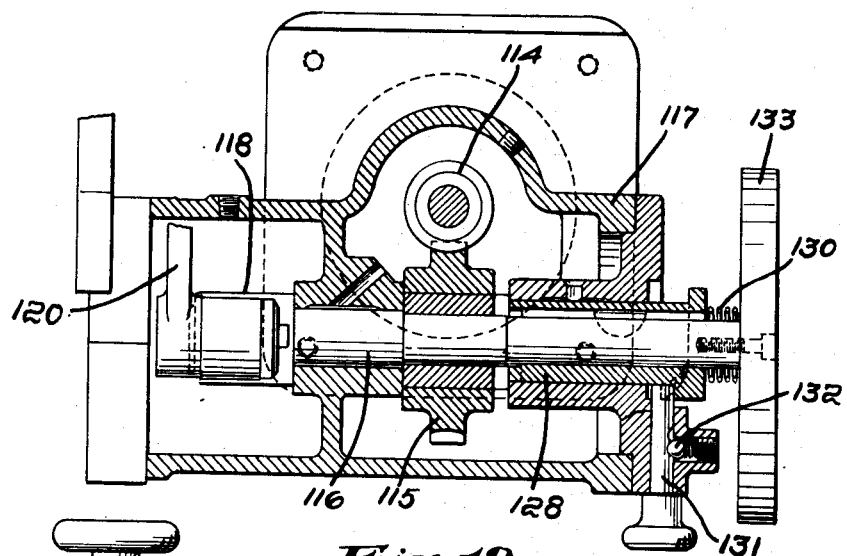
Figure 19:
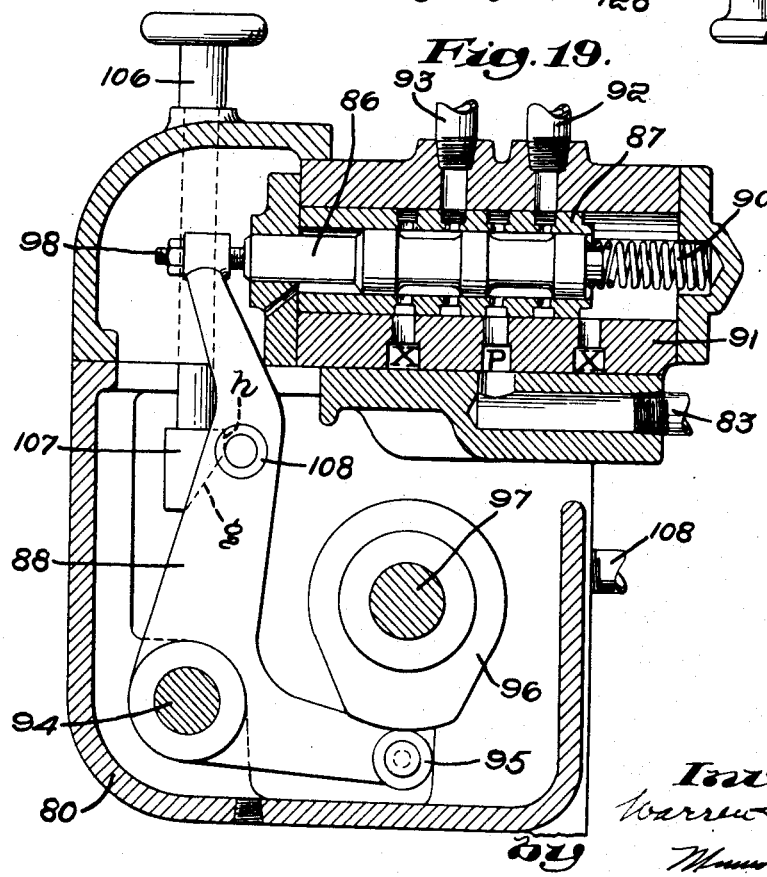

Figs. 8 and 9 are vertical, sectional views taken approximately on the lines 8—8 and 9—9, respectively, of Fig. 7;

Fig. 10 is an elevation of the valve forming part of the hydraulic operating mechanism for producing the approaching movement of the wheel to the work during the grinding operation;

Figs. 11 and 12 are sectional views taken on the lines 11—11 and 12—12, respectively, of Fig. 10;

Fig. 13 is a sectional view taken on the line 13—13, Fig. 9;

Fig. 14 is an end elevation of part of the hydraulic controlling mechanism for producing certain functions of the machine;

Fig. 15 is a vertical, sectional view on the line 15—15, of Fig. 14;

Fig. 16 is a similar view on the line 16—16 of Fig. 15;

Fig. 17 is a side elevation of the turret;

Fig. 18 is a sectional view on the line 18—18, Fig. 20;

Fig. 19 is a transverse, vertical, sectional view through the timing mechanism for the machine;

Fig. 20 is a side view of the mechanism for producing an end-wise reciprocation of the grinding wheel and its shaft;

Fig. 21 is a diagrammatic view of the hydraulic system with which the machine is equipped;

Fig. 22 is a longitudinal, vertical, sectional view of said timing mechanism, with some parts shown in elevation;

Fig. 23 is a diagram showing the wiring for some of the electrical motors used in the machine;

Fig. 24 is a front elevation of the control panel at which the various functions of the machine are governed; and Fig. 25 is a diagram of the electrical system for driving the work holders.

*General organization*

Figure 1:
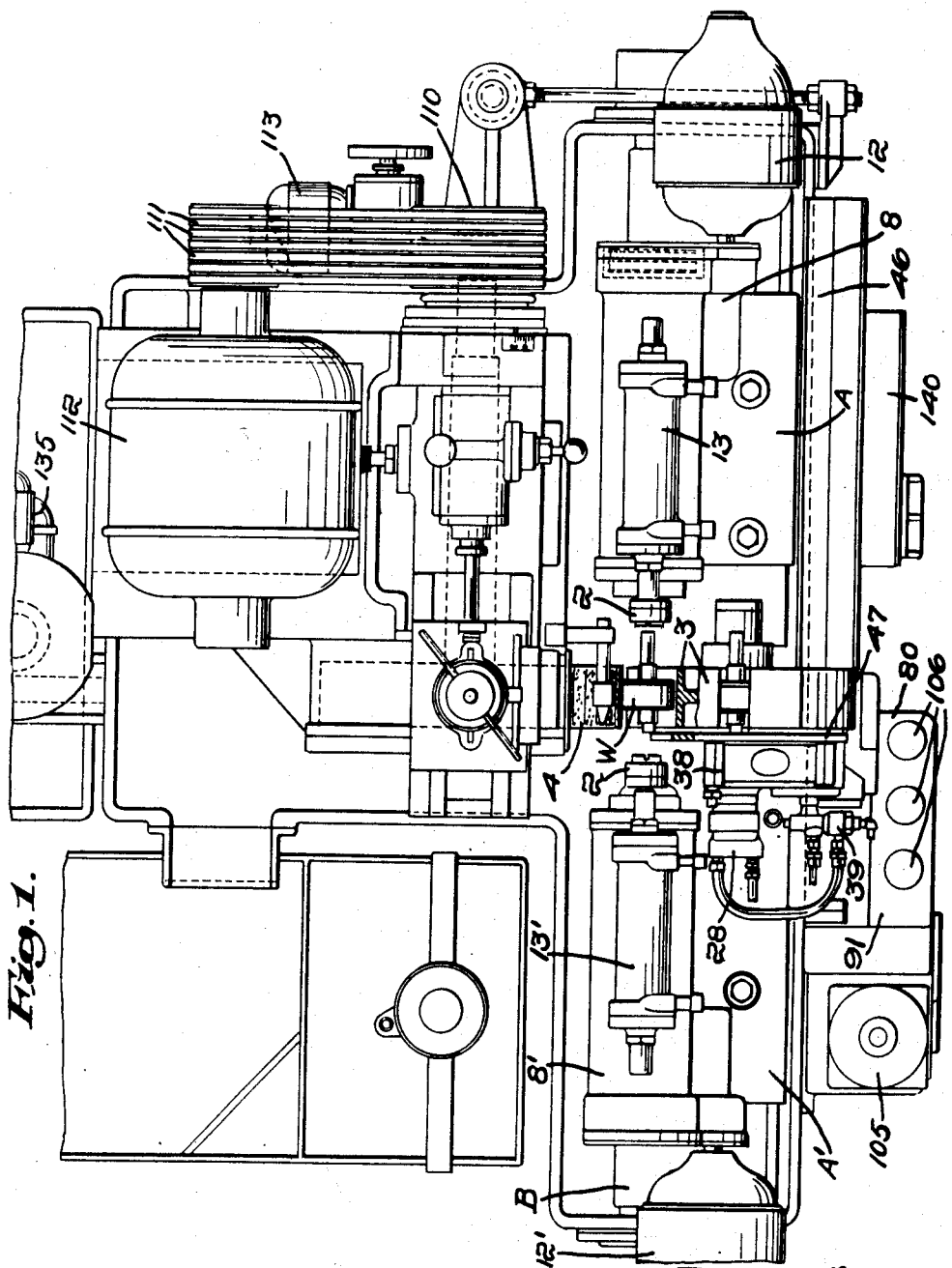
Fig. 1 is a plan view of an automatic grinder organized in accordance with the present invention.

The grinder shown in the drawings comprises a pair of work-holding chucks 2—2, Fig. 1, of the live-spindle type with individual motors for revolving them and hydraulically operated mechanism for actuating them to engage and release an article of work; a turret 3 for presenting the articles of work successively in position to be picked up by said chucks and supported by them for the operation of the grinding wheel 4; an indexing mechanism, hydraulically operated, for cooperating with the turret to give it those movements whereby it carries a work piece into grinding position and later moves it away from said position; a work ejector for discharging the finished work pieces from the turret; power driven mechanism under the control of the operator for moving the wheel head to and from the work; additional hydraulically operated mechanism for moving the wheel relatively to the wheel head to give it an approaching movement into engagement with the work, holding it in the desired position during the grinding-out of the work and then receding so that the indexing mechanism can move the finished work piece away from grinding position and carry a new work piece into that position; a mechanism for reciprocating the wheel shaft axially through a short stroke; timing mechanism for coordinating the different functions of the machine; and a control panel positioned closely adjacent to the turret so that a single workman can feed the machine and can control its operations without materially shifting his position.

The detailed description of the various units and mechanisms of the machine will be taken up in approximately the order in which they have just been mentioned.

*Work holding mechanism and operating means therefor*

Figure 4:
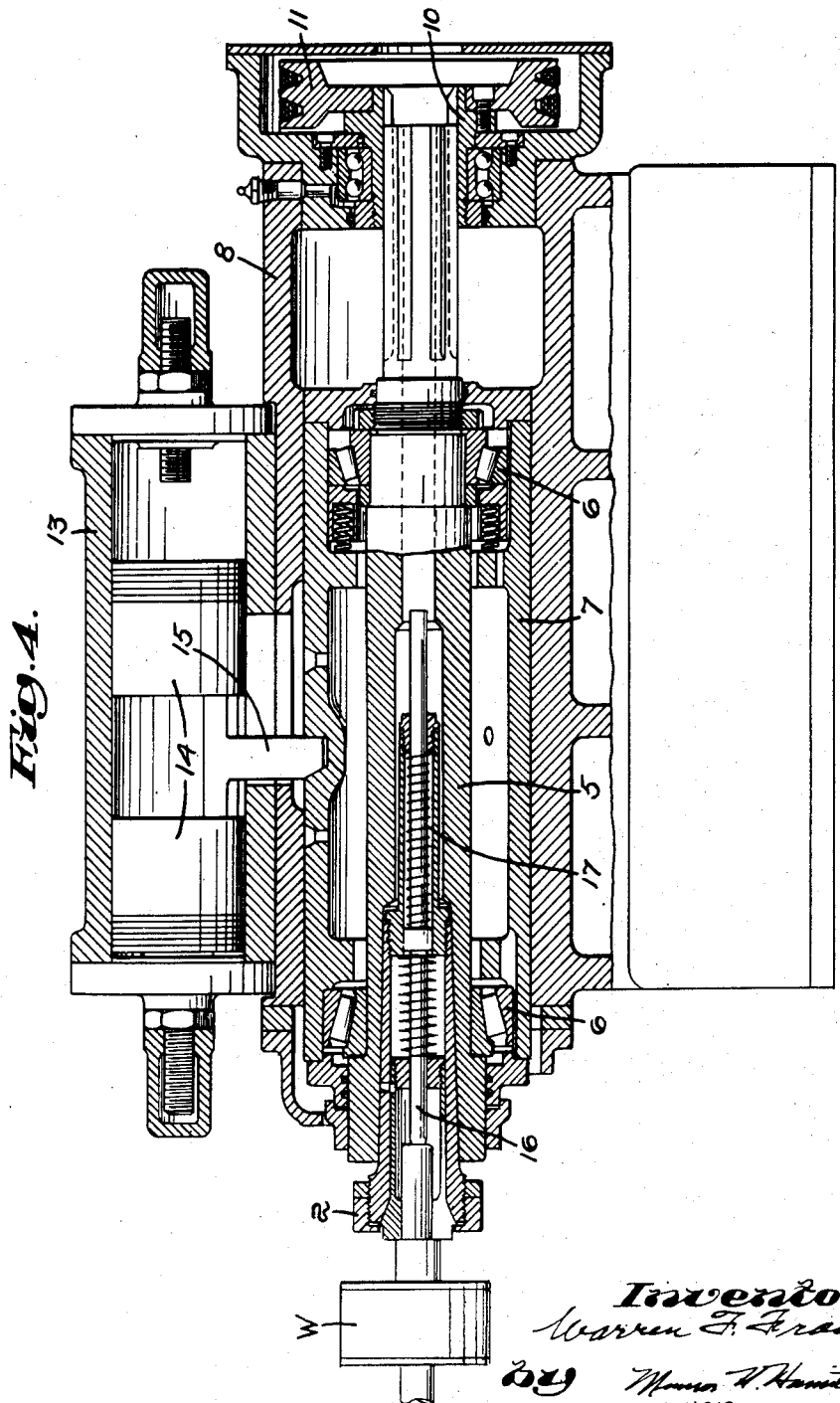
Fig. 4 is a vertical, sectional view through one of the work-holders and part of the operating means for it.

For convenience, the work holders 2 and 2' above referred to, may be designated as the tail and head stocks, respectively, although they are alike in construction and are similarly operated. Fig. 4 shows the tail stock in considerable detail. It comprises a collet of a common form mounted in the end of a hollow spindle 5, this spindle being supported by antifriction bearings 6—6 to revolve rapidly in a spindle body or sleeve 7. The body itself is supported for limited axial sliding movement in a stationary chuck cylinder or housing 8. At its rearward end portion the spindle is splined to the hub 10 of a pulley 11, this pulley being supported on ball bearings for rotation in the chuck cylinder 8. It is connected by a V-belt drive with the electric motor 12, Fig. 1, supported on the machine frame. Consequently, the entire chuck assembly can be revolved by power and the chuck can be moved axially while it is so revolved.

In order to move the chuck backward and forward to engage and release a work piece, such as that shown at W in Fig. 4, the chuck sleeve is supported to slide in the cylinder 8, as above mentioned, and an hydraulic mechanism is provided to reciprocate this sleeve and the parts mounted in it. This mechanism comprises a cylinder 13, Fig. 4, mounted on top of the casing 8, with a double piston 14 working in it, this piston having a tongue or lug 15 extending downwardly from it through slots in the cylinders 8 and 13, with its lower end entered in a socket formed in the upper side of the sleeve 7. Consequently, when fluid is supplied to one end or the other of the cylinder 13, by a valve mechanism later to be described, the sleeve 7, with its spindle 5 and the chuck 2, will be moved backward or forward in accordance with the direction of pressure applied by the fluid.

In the particular construction shown in the drawings, the work piece W consists of an armature for a small motor or generator, and it has been assembled with its shaft as a self-contained unit prior to the grinding operation. Consequently, the chucks 2 and 2' have been shown as adapted to cooperate with this particular type of work piece. As illustrated in Fig. 4, the chuck includes a split collet of a well known type so mounted in the spindle 5 that the collet is opened as the spindle is moved backwardly, or toward the right, and is closed during the movement of the spindle in the opposite direction. The chuck also includes an ejecting rod 16 urged outwardly by the spring 17.

As above indicated, the head stock 2' is a duplicate of the tail stock, except that the parts are reversed, and both are constructed, arranged and operated in the same manner. In the drawings, parts of the head stock corresponding to those of the tail stock are indicated by the same, but primed, numerals.

When a work piece, such as that shown at W, is brought into grinding position by the turret 3, the chucks 2 and 2' are moved by their respective hydraulic mechanisms toward each other simultaneously; the collets open to admit the opposite end portions of the shaft of the work piece; and as the two chucks are forced toward each other, the collets are closed by these movements so that they grip the work piece securely. Because the chucks are rotating at this time, they start the work piece into rotation about the common axis of the two spindles.

Figure 5:
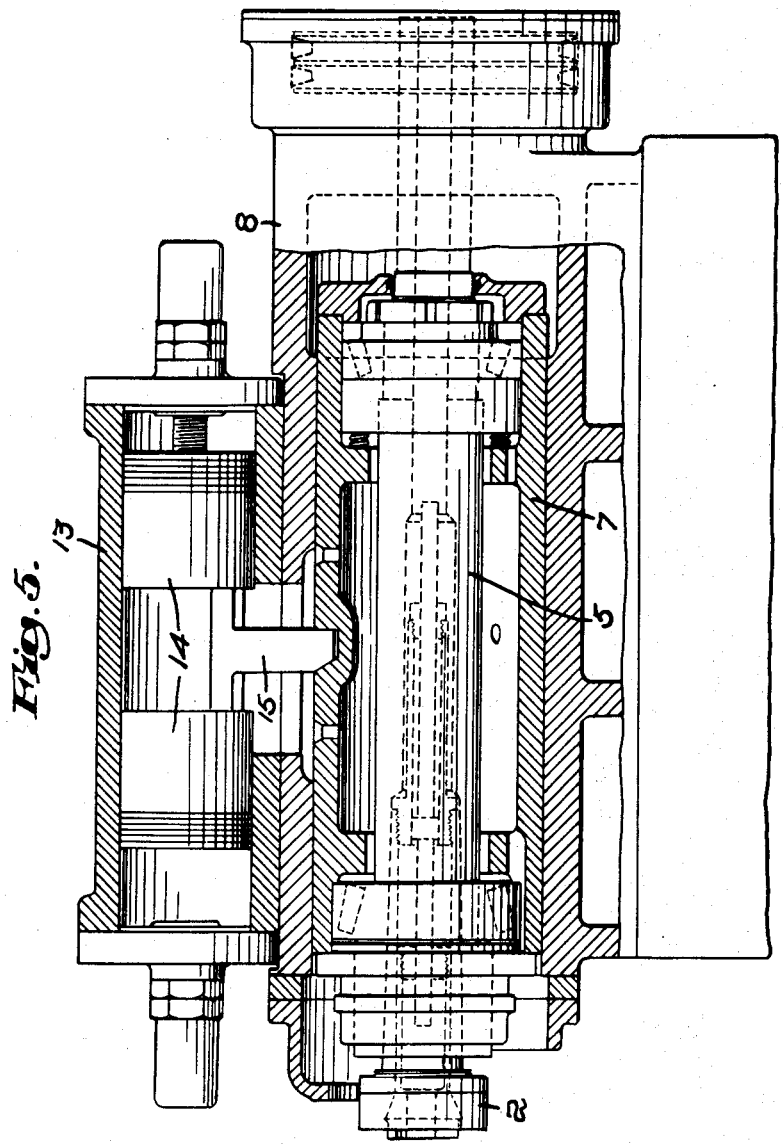
Fig. 5 is a view similar to Fig. 4 but illustrating some parts in elevation.
Figure 6:
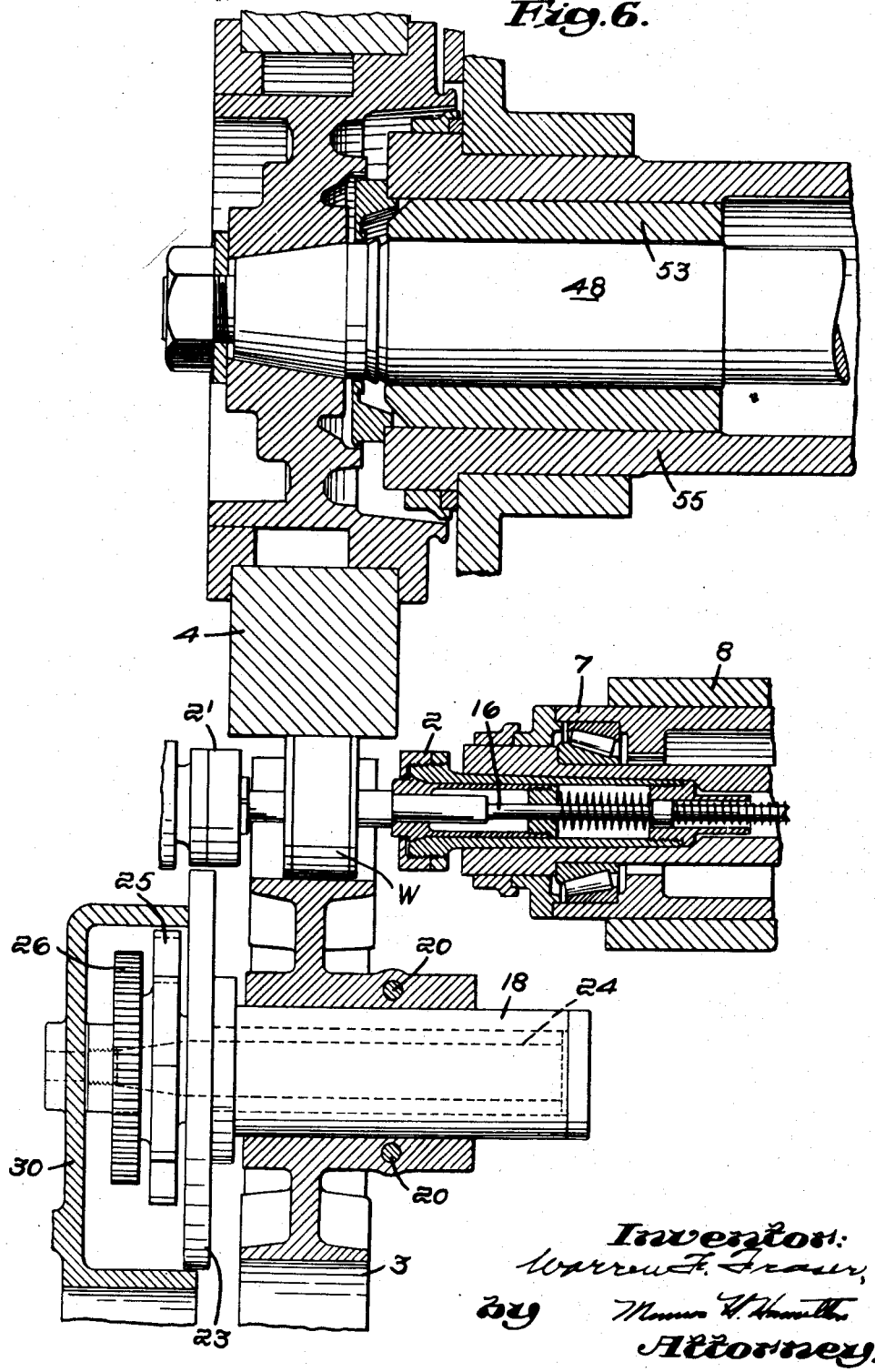
Fig. 6 is a horizontal, sectional view showing portions of the turret; the work holder; and the grinding wheel; and illustrating their cooperative relationship to each other.

After the grinding operation has been performed on this piece of work, the hydraulic mechanism operates to move the two chuck spindles backwardly away from each other, during which time the collets open; and the ejectors, one of which is shown in Fig. 4 at 16, cooperate with each other to hold the work piece centered between them and in the turret, while the collets withdraw, so that when this withdrawal movement has been completed, the work piece is left free in one of the pockets of the turret. Fig. 5 shows the tail stock in its backward position.

The tail and head stock assemblies 13 and 13' are supported on brackets A and A', respectively, and both of these brackets are mounted on a guide B, Fig. 14, rigid with the machine frame, and on which the brackets may be adjusted toward and from each other to vary the spacing of the stocks. They are secured in their adjusted positions by bolts, one of which is shown at 9 in Fig. 14.

*Turret structure and operating mechanism therefor*

The turret per se is best shown in Figs. 15 and 17. It comprises a body of cylindrical form having a series of nearly circular pockets formed in its peripheral section and of such dimensions, with reference to the work pieces, that these pieces are somewhat loosely received in them with a part of the edge of each work piece projecting for an appreciable distance beyond the periphery of the turret. Because the work pieces are initially presented to the chucks 2 and 2' by the turret, it is important that the turret shall be so constructed and its operating mechanism shall be so designed as to present the work accurately to the work holders so that they can pick it up and center it automatically as they move toward each other to engage and clamp the work.

For these reasons the two sections of the turret are machined accurately; the parts are secured together and to a central bearing sleeve 18 by means of bolts 20—20, and this sleeve is mounted to revolve on two bushings 21—21, Fig. 15, which are supported on a stationary tube 22 formed rigid with, and projecting laterally from, a plate 23 that is securely fastened to the machine frame. Fitting snugly, but rotatably, in the tube 22 is a stub shaft 24, Fig. 15, the left-hand end of which is supported in the bearing 19 while a head 31, rigid with the right-hand end of the shaft, is secured to the end of the sleeve 18 by several screws. The index plate 25, which controls the rotary position of the turret, is keyed fast on a tapered section of this shaft 24. Consequently, any rotative movement imparted to the plate 25 is transmitted accurately to the turret without lost motion between these parts. On the hub section of this plate 25 is a gear wheel 26, screwed to the plate, and the wheel meshes with a pinion 27 which is revolved by an hydraulic motor 28, Figs. 14 and 15. This motor may conveniently be of the well known gear type.

The operation of the indexing mechanism will be best understood by reference to Fig. 16. As there shown, the index plate 25 is provided with a series of indentations each terminating in a radial shoulder or tooth 33. These are spaced by angular distances equal to the spacing of the pockets in the turret, and they register with the axes of said pockets. The motor 28 tends constantly to revolve the pinion 27 and therefore to rotate the gear 26 and its plate. At predetermined times, however, such rotation is prevented by the engagement of the pawl 34 with one of the shoulders or teeth 33. This pawl is made in the form of a bell crank lever, fast on the rock shaft 35, and its upper arm terminates in a flattened face $a$ positioned to bear against a similar face $b$ on a latch lever 36 which is fulcrumed in a vertical slot formed in a piston 37 that runs in an hydraulic cylinder 38. Oil, under pressure, is admitted to the cylinder through the inlet 40 at predetermined times, thus forcing the piston toward the right against the pressure of a spring 41. As the piston 37 is so moved, carrying the trip lever 36 with it, the engagement of the faces $b$ and $a$ with each other turns the pawl lever 34' in a clockwise direction, the lever 36 being held in its operative position, partly by the spring-pressed pin 42 and partly, also, by another pin 43 fixed in the piston. As these movements continue with the pawl lever swinging about the center of the shaft 35 and the lever 36 moving in a straight line, the latter strikes a fixed pin 43' which rocks the lever 36 backwardly and tips the pawl 34 until it finally releases the tooth 33 with which it is in contact. Thereupon the pinion 27 immediately starts the gear 26 into rotation and initiates the indexing movement of the turret. Shortly after this action occurs, however, the face $b$ of the latch 36 slides off the upper edge of the end $a$ of the arm 34', thus disengaging these members from each other. The pawl 34 falls down on the peripheral surface of the index plate, as the latter rotates, and it drops into the next notch in said plate, engages the tooth 33 at the end of that notch, and arrests further rotation of the plate and the turret. When the flow of oil is cut off from the cylinder 38, the spring 41 moves the piston 37 backwardly toward the left, thus restoring the parts to their original positions, the latch 36 snapping over the upper end of the lever 34' during this return movement of the piston.

It is desirable to bring the turret to a stop slowly, and for this purpose a throttle valve 39, Figs. 14 and 21, is connected in the exhaust line from the motor 28 to control the rate of discharge of oil from it. Normally the valve is held closed by a spring, but it is opened automatically by the movement of the pawl 34 as the indexing operation takes place. That is, the lever 75 is secured fast to the rock shaft 35 on which the pawl also is mounted. Immediately beside the lever, and forming part of it, is a rib carrying a contact $e$, Fig. 14, which is positioned to engage the end of a screw $f$ threaded into the plunger of the valve 39. Consequently, when the pawl is lifted to initiate the indexing operation, as above described, the lever 75 is swung toward the right, Fig. 14, and opens the valve 39. But as the indexing movement continues, and the pawl drops lower and lower into the next notch, the valve is gradually closed by its spring, thus throttling the escape of oil from the pump to such a degree that the turret is brought to an easy stop.

This same arrangement makes it convenient to index the valve manually whenever desired since, by moving the lever toward the right, the throttle valve 39 will be opened, releasing the pressure at the exhaust end of the motor 28, thus starting up the motor and producing an indexing movement of the turret in the same manner that this action would occur if initiated automatically, as above described.

These indexing operations are repeated indefinitely as the machine continues in operation, the turret pockets being moved successively into their different positions, which are spaced apart by exactly an eighth of a revolution. The mechanism operates with great accuracy because the start of each rotative movement is controlled by the release of one of the teeth 33 by the pawl 34, and it is stopped again by the engagement of the next succeeding tooth with the same pawl. The parts are made sturdy and substantial in construction; the index wheel and the turret are rigidly connected together; and the turret is supported between bearings on the rigid tube 22 so that the opportunity for any substantial vibration or lost motion is eliminated.

Work ejector

Figure 2:
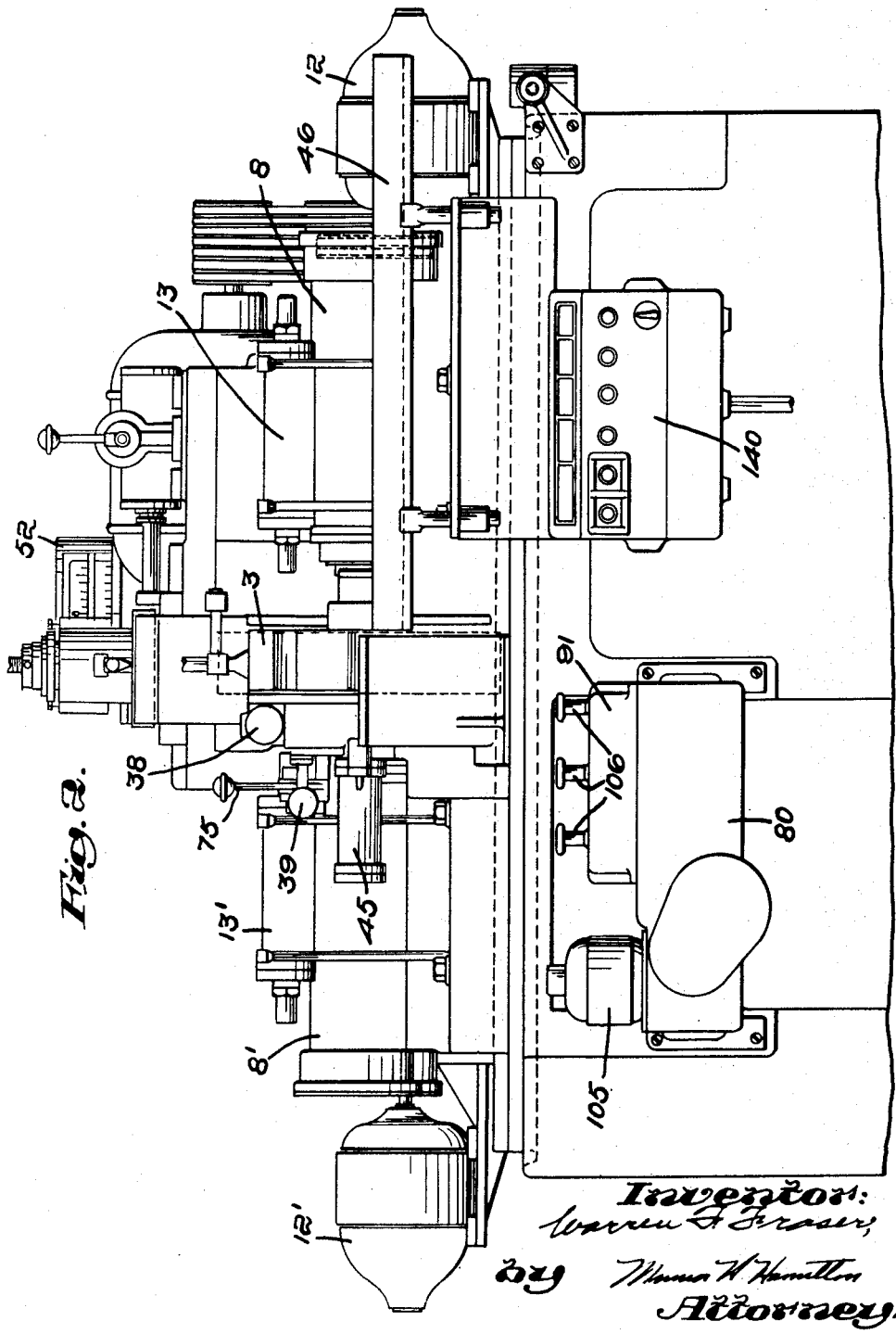
Fig. 2 is a front elevation of the machine shown in Fig. 1.

The machine, as shown, is designed to have the work pieces feed into the turret by hand as the pockets come around to the upper part of their path of rotation, and the work is ejected from successive pockets at a position diametrically opposed to the grinding position. For this purpose an ejector rod 44, Fig. 17, which is secured rigidly in a piston working in the hydraulic cylinder 45, Figs. 2 and 21, is provided. This rod is operated at the proper times to force the finished work pieces, one after another, into a V-shaped trough or guide 46, Figs. 1, 2 and 3.

In placing the work pieces in the turret, the workman pushes the pieces successively into the pockets as they arrive in the proper position and slides each one inwardly until its inner end strikes the face of a stationary plate 47, Figs. 1 and 15, which is secured rigidly to the casing 30. This plate is of annular form, except that its end adjacent to the grinding wheel 4 is shaped, as shown at C, Fig. 14, to avoid interference with the movements of the tail stock 2'. In this way the work pieces are initially centered laterally in the turret. The turret itself is adjustable lengthwise of its bearing sleeve 18 so that its position may be varied to suit the requirements of different articles of work.

Grinding wheel head assembly

Referring to Fig. 7, it will be seen that the grinding wheel 4 is keyed to the left-hand end of a shaft 48, supported in suitable bearings in a wheel head 50, which is mounted on guideways 51—51 for movement toward and from the work holding mechanism. The mechanism for moving this wheel head on the guideways is disclosed in a pending application Serial No. 714,168, filed jointly by this applicant and another, and reference may be made to that application for an understanding of the details of construction of this mechanism. Briefly, it involves an electric motor, controlled by switches mounted on the control panel, and operable to move the entire wheel head assembly either at a high speed or a low speed, as desired, toward or from the work. And the degree of movement can be easily read on large dials contained in the casing 52, Figs. 2 and 3.

When the wheel head has been positioned properly by this mechanism for the grinding of a series of articles of work, which are substantially duplicates, an additional mechanism is then utilized to give the wheel those movements required in each grinding cycle. These include an approaching movement of the wheel into contact with the work; a slow continuation of that movement terminating in a dwell while it grinds out the work piece; and then a receding movement near the end of which the turret is indexed to move the finished piece of work out of grinding position and to bring a different piece into said position.

For this purpose the shaft 48 is supported in a bearing bushing 53, Figs. 7 and 8, and in a set of antifriction bearings 54, Fig. 7, for rotation around its own axis. In addition, these bearing members are mounted in a large eccentric sleeve or quill 55 which, in turn, is supported in bearings formed in the wheel head frame 50. In Fig. 8 the axis of the quill is shown at c and that of the shaft 48 and bearing 53 at d. It will thus be evident that if the quill 55 is given a rotative movement in a counter-clockwise direction from the position in which it is shown in Fig. 8, it will move the grinding wheel toward the work. On a reverse rotative movement the wheel will be carried back to or through its initial position. According to the present invention this oscillating motion is produced hydraulically under the control of a dash-pot.

Referring to Figs. 7, 9 and 13, it will be seen that the quill 55 has two arms 56 and 57 rigidly secured therein and projecting upwardly therefrom, each terminating at its upper end in an approximately cylindrical bearing piece. Each of these arms projects into a cut-out or recess in a piston, that for the arm 56 being shown at 58 and that for the arm 57 being illustrated at 59, and these pistons are mounted to reciprocate in hydraulic cylinders 60 and 61, respectively.

Consequently, if fluid is admitted alternately to opposite ends of the cylinder 60 it will operate through its connections with the quill 55 to rock or oscillate that quill through a substantial angle. Similarly, if suitable connections are provided between this cylinder and the cylinder 61, the latter may be utilized to operate as a dash-pot to control the rate of swing of the quill. Such connections are here provided, and they include a valve mechanism, best illustrated in Figs. 9 to 12.

Bearing in mind the fact that 60 is the actuating cylinder, liquid under pressure is led into it through the pipe 62, Figs. 13 and 21, to move the grinding wheel toward the work. At this time the left-hand ends, Figs. 9 and 13, of both cylinders are filled with oil, the piston 58 is at the backward limit of its stroke, and the arm 57 is further to the right than as shown in Fig. 9. As pressure of the oil entering the actuating cylinder 60 through the pipe 62 begins to force the piston 58 forward or toward the left, Fig. 9, the oil in the forward end of this cylinder is forced out through the outlet port 63, Fig. 10; flows upwardly through the passage 65 in the valve casing 64, and out through the return pipe 77. As the piston 58 moves forward it acts through the arm 56 to rock the quill 55 in a counterclockwise direction, and the arm 57 in the dash-pot cylinder 61 swings with the arm 56. After a short idle movement it engages the piston 59 and moves it forward, thus expelling oil from the left-hand end of the dash-pot cylinder. This oil has a path of discharge through the port 66, past the needle valve 69, through the channel 70, into the passage 65 to the outlet 77, and the rate of such discharge can be varied by adjusting the needle valve. The rate of escape of oil from both cylinders through the return pipe 77 is controlled by a valve in the casing 80, Figs. 21 and 22, which also controls the admission of oil to the actuating cylinder through the pipe 62.

It should also be noted that a path is provided for the flow of oil from the exhaust port 63 of the actuating cylinder 60, through a passage 66 and ball check valve 67, to the port 68 opening into the cylinder 61. Just how the flow will be divided through these passages will depend upon the pressure conditions in the two cylinders, the rate of inflow through the pipe 62, and the rate of exhaust of the oil through the pipe 77. These are all factors under control, and the conditions are so adjusted that as the forward movement of the piston 58 continues, the pressure in the dash-pot cylinder 61 builds up, due to the throttling action on the oil escaping from it through the needle valve. However, the pressure which builds up in the dash-pot cylinder 61 acts on the piston 59 in a direction opposed to that exerted on the piston 58 by the incoming oil in the cylinder 60. Consequently, by properly adjusting the needle valve 69, the forces utilized in the two cylinders 60 and 61 thus can be made to oppose each other to exactly the degree necessary to give the desired slow rate of movement of the grinding wheel toward the work.

When the flow of oil to the cylinders 60 is reversed to move the grinding wheel away from the work, oil then is led into both cylinders through the pipe 77, and it forces both pistons 58 and 59 backwardly toward the right, Fig. 9. The motion of the quill so produced carries the grinding wheel away from the work and no dash-pot or cushioning action is created during this return swing.

The extreme range of oscillating movement of the quill may be limited by stops 71—72, Fig. 9, both carried by the quill and cooperating with a stationary stop 73 on the wheel head frame. In a typical instance this range of oscillation may be in the neighborhood of 35° or 40°. An adjusting screw 74 also cooperates with the dash-pot piston 59 to limit the range of movement of the latter. Its main function is to permit adjustment of the point in the approaching movement of the grinding wheel at which the retarding action of the dash-pot will begin. That is, considerable lost motion of the arm 57 relatively to the piston is provided by the length of the recess formed in the piston to accommodate the arm. Because of it, the dash-pot action does not start on the forward movement of the actuating piston 58 until the arm 57 has engaged the piston 59 and begins to move it toward the left, Fig. 9. The adjustment of the screw 74, therefore, determines the length of that portion of the approaching movement during which the dash-pot will operate, in each grinding cycle, to retard or cushion said approaching movement. The intensity of that retarding action is determined by the adjustment of the needle valve 69.

This oscillating mechanism operates very smoothly; positively; is extremely reliable; and is easily and quickly adjusted for a change in work.

Timing mechanism

It will be observed that the above mentioned hydraulically operated units include the tail stock 13, the head stock 13', the wheel head oscillating mechanism actuated by the cylinder 60, the turret indexing mechanism, including the trip cylinder 38, and the work ejector operated by the cylinder 45. It is obviously essential to the successful operation of the machine that the functions of these five different units be so coordinated that their operation will take place in the desired sequence and in the proper time relationship to each other. These controlling and timing operations are performed by a set of valves and a series of cams for operating them. All of this mechanism is mounted in a casing 80, shown in its relation to other parts of the machine in Figs. 1, 2 and 3, and illustrated more in detail in Figs. 19 and 22.

The valves of the entire set illustrated in Figs. 21 and 22 are alike and are of the slidable plunger type. A single valve and its operating mechanism is shown in Fig. 19. It includes a plunger 86 mounted to reciprocate in a valve cylinder 87 and arranged to be moved in one direction by a lever 88 and in the opposite direction by a coiled spring 90. The valve cylinder 87 and the housing 91 in which it is mounted are equipped with the usual ports and passages common in valve mechanisms of this type. These include pressure ports P and exhaust ports X, Fig. 19, the plunger 86 being designed to connect these ports at suitable times with the pipes 92 and 93 running to the various actuating cylinders for the units so as to produce the desired operations above described. The pipes 92 and 93 cooperating with each valve plunger are not in alignment with each other, as indicated in Fig. 19, but are staggered, as shown in Fig. 21, in order to economize space.

All of the valve operating levers 88 are mounted on a common shaft 94, and each carries a roll 95 running on the peripheral surface of a cam 96, all of these cams being secured by set screws on a single cam shaft 97. Each cam is contoured to suit the requirements of the function which its respective valve is designed to perform, and each is adjustable on the shaft 97 so that the timing of its function can be coordinated with that of one or more of the other valves. Each lever 88, also, carries an adjusting screw 98 at its upper end for engagement with its respective valve plunger 86 to assist in producing this timing action.

Mounted on the left-hand end, Fig. 22, of the cam shaft 97 is a worm wheel 99, Fig. 22, meshing with, and driven by, a worm 100 fast on a shaft 101 which is belt or chain connected to another shaft 102 carrying another worm wheel 103 driven by a worm 104 fast on the shaft of the electric motor 105. This motor customarily is of the constant speed alternating current type, equipped with an automatic brake having a solenoid release so that the brake is normally off but is applied as soon as power is cut off from the motor. Preferably, also, the gear mechanism just described is of the change-gear type so that the speed at which the cam shaft 97 is driven can be varied to suit the requirements of different kinds of work.

With this arrangement, therefore, the timing of the operations of the various hydraulically actuated units can be controlled and adjusted relatively to each other with a high degree of precision. The entire controlling mechanism is compact and can be positioned where it will be most convenient for the workman to operate it.

There are times when it is desirable to lock certain of the valves out of action, while others are allowed to continue in operation. This object is accomplished by providing a simple form of valve lock. In Fig. 19 such a lock is shown comprising a plunger 106 mounted to slide vertically in the valve casing 80 and provided at its lower end with a foot 107 having a diagonal surface g adapted to engage a roll 108 on the valve lever 88 and force it laterally far enough to move the lower cam roll 95 below the path of travel of the high portion of the cam 96. Also formed on this foot is a short "flat" h which slides in behind the roll 108 and holds the valve lever in the inoperative position to which it has been moved. A head on the upper end of the plunger is provided for convenience in moving it up or down. When the plunger is down, its particular valve is out of action, but it can be restored to operation again by raising the plunger. In the particular construction shown, three of these plungers 106 are provided; one for controlling both the head and tail stocks; another for controlling the wheel head oscillating mechanism; and the third for controlling the ejector.

Figure 3:
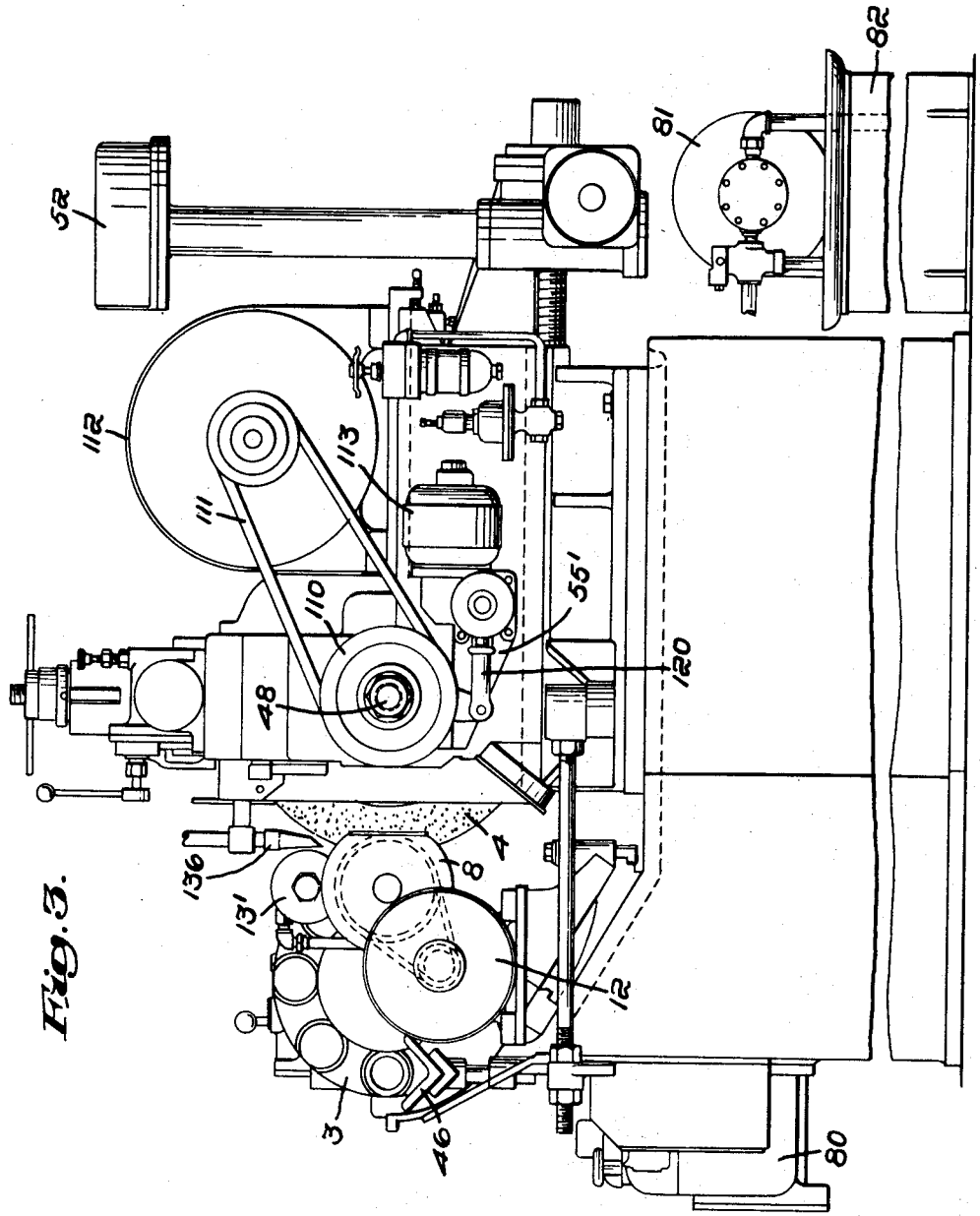
Fig. 3 is a right-hand end view of said machine.

Oil under pressure is supplied to the entire hydraulic system by a pump 81, Figs. 3 and 21, which draws it from the supply tank 82 and forces it through the pump pressure piping system illustrated in Fig. 21, part of this oil being carried by the pipe line 83 to the intake ports of the entire set of valves in the casing 80. The exhaust oil from the various units is led back either through the exhaust line 84, Fig. 21, or through the gravity drain system 85, the latter also carrying the leakage oil from the different units.

As indicated in Fig. 21, a few of the pipe connections from the main control valve 80 to the various units carry oil in one direction only, but most of them convey oil in one direction at certain times and in the opposite direction at other times, all depending upon the adjustment of the particular valve cooperating with the respective pipes. One of the outlets in the valve housing 91 is plugged, as shown at 107 in Fig. 21, since the companion outlet, which is connected with the trip cylinder 38, supplies the requirements of that particular unit.

In practically all of these units some leakage will occur, and the gravity drain line 85 is so connected with these various units as to conduct all of the oil back to the supply tank 82. For example, the drain connection for the valve casing 80 is shown in Fig. 19 at 108, and that for the index plate casing 30, Fig. 15, is indicated at 109. In both of these instances the drain is positioned to control the oil level in its respective casing.

*Grinding wheel drive and axial reciprocation*

On the end of the grinding wheel shaft 48, opposite to that of the wheel itself, is a pulley 110 which is connected by a V-belt 111 with an electric motor 112 for revolving the grinding wheel.

It is desirable to reciprocate this shaft and the grinding wheel axially through a short stroke in order to break up any tendency to produce circumferential lines on the work or, in other words, to make a smoother surface and better to distribute the wear on the wheel. For this purpose another motor 113 is mounted on a plate 55' which is secured rigidly to the flanged end of the quill, as shown in Figs. 3, 7 and 20. A worm 114, Fig. 20, pinned to the shaft of this motor meshes with, and drives, a worm wheel 115, Figs. 18 and 20, which is mounted on a transverse shaft 116 supported in the casing 117. Formed integral with the shaft 116 at its left-hand end, Fig. 18, is a crank 118, pivoted to one end of a link 120, the opposite end of which is pivoted at 121, Figs. 7 and 20, to the end of an arm 122 having an annular section which is clamped on a ring 123, Fig. 7. This ring is held against the end of the quill 55 by means of a grooved annular collar 119 which is, itself, screwed to the end of said quill, and it has an internal screw thread meshing with threads on the end of a sleeve 124 that encircles the outer race of the bearing 54, is axially fixed to the spindle 48, and circumferentially fixed to the quill 55 by means of a pin 125 projecting into a block which runs in a slot 126 formed lengthwise in said sleeve 124.

It will be evident that with this arrangement, when the motor 113 is oscillating the link 120, the rocking motions so imparted to the ring 123 will cause the internal threads of that ring to operate on the threads of the sleeve 124 to move the latter axially, first in one direction and then in the opposite direction. This mechanism thus operates very smoothly to give the grinding wheel the desired axial reciprocation necessary to produce a good surface on the work. Its action is not affected by oscillation of the quill because it is mounted on that member.

At times it is desirable to be able to disconnect this oscillating mechanism from the motor 113, and for this purpose a clutch is built into the assembly illustrated in Figs. 18 and 20. Clutch teeth 127, Fig. 20, are formed on the end of the hub of the worm wheel 115 and cooperating teeth are formed on the end of the sleeve 128. The worm wheel is free on the shaft 116, but the sleeve 128 is splined to the shaft and it is mounted to have a short sliding movement on said shaft. Normally a spring 130, Fig. 18, holds the sleeve toward the left and thus completes the drive through from the worm wheel to the shaft 118. However, this sleeve may be moved toward the right, Fig. 18, far enough to disengage it from the wheel 115, and a plunger 131 can be pushed inwardly far enough to engage a head on the sleeve and hold it in its unclutched position. At this time, therefore, no motion will be transmitted from the motor to the shaft 116. A spring-pressed ball 132 yieldingly locks the plunger 131 in either its in or out position. A flywheel 133 is secured on the end shaft 116.

*Electrical control system*

Fig. 23 shows diagrammatically the electrical system for supplying current to the motors which drive the various units above mentioned, except the head and tail stock motors. In addition to the wheel head motor 112, the cam set motor 115, and the motor 113 for reciprocating the grinding wheel, another motor 81' is provided for operating the pump 80, Fig. 21, which supplies oil to the entire hydraulic system, and an additional motor 135, positioned at the back of the machine, as indicated in Fig. 1, operates another pump which feeds coolant to the wheel head through a nozzle 136, Fig. 3.

Current is supplied to this system from a three-phase line 137, through a main switch 138, mounted on the control panel 140 shown in Fig. 24. This line switch feeds three magnetically operated switches indicated, respectively, at D, E and F. Associated with them are coils D', E' and F', the arrangement being such that when these coils are energized the respective switches are closed, and when current is shut off from the coils, then the switches are opened automatically. Current for these coils is furnished by the secondary winding of a small transformer G, the primary winding of which is connected across two terminals of the line switch 138. It serves to reduce the line potential to 110 volts, or some other voltage suitable for use in a factory.

The flow of current to the coils D' and E' is controlled by "start" and "stop" push buttons 141 for operating the switch D; 142 for operating the switch E; and 143 for operating the switch F. By operating the push button switch 141 the motor 112 for operating the wheel head may be started and simultaneously with it the coolant motor 135 is started. Operation of the push button 142 simultaneously starts, or stops, the hydraulic pump motor 81' and the motor 113 for reciprocating the grinding wheel axially, it being noted, however, that there is another hand switch 144 in the circuit of the motor 113, and that this switch must be closed before this motor will start up. Operation of the switch 143 starts or stops the cam-set motor 105. Also included in this system are suitable safety devices with which, however, the present invention is not concerned.

The electrical drive for the head and tail stock motors 12 and 12' is illustrated in Fig. 25. As there shown, these motors are of the shunt-wound type adapted to operate on direct current or rectified A.-C. current. They are connected in parallel to a supply line 145 with a rheostat 146 in series with both, and with individual rheostats 147 and 148 connected into the field circuits of both. By adjusting one or both of the latter rheostats, the speeds of the two motors can be equalized and the speed of both can be adjusted simultaneously and to the same degree by adjustment of the rheostat 146. The control switch in the supply line 145 is shown at 150, Fig. 24.

It should be observed that all of the manually operated switches used in the system shown in Figs. 23 and 25 are mounted on the face of the control panel 140, Fig. 24, except the switch 144. This switch is seldom used, and is supported at the rear of said panel. Also mounted on this panel are the two switches 151 and 152 for controlling the cross-feed, as explained fully in the patent application above referred to. It should likewise be noted that the control panel 140 is mounted closely adjacent to the control plungers 106 in the cam-set 80, as clearly shown in Fig. 2. Also, that the turret 3 is positioned just above and, in a general way, between the cam-set and the control panel. Consequently, an operator standing at the front of the machine on a convenient position to feed work pieces into the turret, is constantly within reach of all of the push buttons or switches on the control panel, as well as the plungers in the cam-set. Thus, the operator has constant control of the machine while he feeds it, and any operation required to change some function of the machine can be produced merely by operating a switch or a plunger. This convenience of operation and control is important in contributing to a high rate of output; preventing accidents; and making the entire manufacturing operation more satisfactory. In many cases it will make it possible for unskilled help to feed a number of these machines while general supervision of them is maintained by an experienced machine operator.

It should also be observed that the unique organization of this machine by units assembled in the proper relationship to each other but each operated by its own prime mover, introduces a high degree of flexibility in the manufacture of the machine, results in economies in its production, and also provides an unusual degree of flexibility in making those changes necessary to shift from one kind of work to another, with a consequent reduction in the time and labor involved in making such changes.

Lubrication presents no special problem in any of the units except the wheel spindle. Oil is fed to it from the pump pressure line 153, Fig. 21, through the pressure regulating valve 154, the filter 155, and the pipe line 156 to a pipe T 157, Fig. 7, from which additional pipes 158 and 159 deliver it to ducts in those bearing sections of the wheel head frame in which the quill rocks. A duct 160 carries the oil radially through the quill to the surface of the sleeve 124 from which part of it flows into the spindle bearing 54. At the opposite end of the quill, ducts 161 and 162 lead the oil to the cooperating surfaces of the spindle bearing bushing 53 and the spindle itself.

The operation of the machine has been described so completely in connection with the desciption of the various units that no further statement as to operation is believed to be necessary. It may be pointed out, however, that as the chucks 2 and 2' approach each other to pick up an article of work presented to it by the turret, they automatically center the work piece for rotation about the common axis of the chucks themselves and, in so doing, they free the work piece from contact with the walls of the pocket of the turret in which the work piece has been carried to the chucks.

While I have herein shown and described a preferred embodiment of my invention, it will be evident that the invention is susceptible of embodiment in other forms without departing from the spirit or scope thereof. For example, in some machines it may be found preferable to operate some, or all, of the hydraulically operated units described in this application by some equivalent form of fluid pressure, such as air pressure. This, and other substitutions of equivalents, or minor modifications, may be made without departing from the spirit or scope of the invention.

This application is a divisional application relating to subject-matter disclosed in an earlier application Serial No. 719,072, which has since issued as Patent No. 2,517,193, issued August 1, 1950.

Having thus described my invention, what I desire to claim as new is:

1. In a machine for grinding rotary work pieces, the combination with means for supporting and revolving a work piece around its own axis, a grinding wheel, a wheel head in which said wheel is mounted for operation on the peripheral surface of the work piece so supported and revolved, the mounting for said wheel comprising a spindle supporting it and an eccentric quill supporting the wheel spindle for oscillating movement about an axis parallel to the axis of the spindle, a turret adapted to hold a series of said work pieces, hydraulic mechanism for indexing said turret to present the work pieces successively to said means, hydraulic actuating mechanism for operating said work supporting and revolving means to cause it to engage and support the work pieces successively as they are presented to it by said turret, hydraulic mechanism for oscillating said eccentric quill during the operating cycle on each piece of work to produce an approaching movement of the wheel into contact with the work, a dwell in which the work is ground, a subsequent receding movement, a single control apparatus for all of said hydraulic mechanisms constructed and arranged to make them operate their respective units in the correct time relationship to each other, said control apparatus including a series of valves for controlling the flow of actuating fluid to the respective hydraulic mechanisms, a power driven shaft, cams on said shaft for operating the respective valves, and means operable to lock the actuating means for one or more of said valves out of operation when desired while the other valves continue to operate normally.

2. In a machine for grinding rotary pieces of work, the combination with means for supporting and revolving a work piece around its own axis, a grinding wheel, a wheel head in which said wheel is mounted for operation on the peripheral surface of the work piece so supported and revolved, the mounting for said wheel including an eccentric member supporting the wheel for oscillating movement about an axis parallel to the axis of the wheel, hydraulic mechanism for actuating the eccentric mechanism, a turret adapted to hold a series of said work pieces, hydraulic mechanism for indexing said turret to present the work pieces successively to said means, hydraulic actuating mechanism for operating said work supporting and revolving means to cause it to engage and support the work pieces successively as they are presented to it by said turret, a single control apparatus for the said hydraulic mechanisms constructed and arranged to make them operate their respective units in the correct time relationship to each other, said control apparatus including a series of valves for controlling the flow of actuating fluid to the respective hydraulic mechanisms, a power driven shaft, a series of cams on said shaft, connections between said cams and said valves for transmitting motion of the cams to the valves to operate them, said cams and said connections being adjustable to change the timing of the valves one relatively to another.

3. In a machine for grinding rotary pieces of work, the combination with means for supporting and revolving a work piece around its own axis, a grinding wheel, a wheel head in which said wheel is mounted for operation on the peripheral surface of the work piece so supported and revolved, the mounting for said wheel comprising a spindle supporting it and an eccentric quill for supporting the wheel spindle for oscillating movement about an axis parallel to the axis of the spindle, a turret adapted to hold a series of said work pieces, hydraulic mechanism for indexing said turret to present the work pieces successively to said means, hydraulic actuating mechanism for operating said work supporting and revolving means to cause it to engage and support the work pieces, successively, as they are presented to it by said turret, hydraulic mechanism for oscillating said eccentric quill during the operating cycle on each piece of work to produce an approaching movement of the wheel into contact with the work, a dwell in which the work is ground, a subsequent receding movement, a single control apparatus for all of said hydraulic mechanisms constructed and arranged to make them operate their respective units in the correct time relationship to each other, said control apparatus including a series of valves for controlling the flow of actuating fluid to the respective hydraulic mechanisms, a power driven shaft and cams on said shaft for operating the respective valves, a control panel, and a plurality of valve levers connected to the said valves and adapted to be manually operable from the control panel.

4. A machine according to claim 3, including electrical switch means for energizing electrical circuits controlling the hydraulic mechanism, said electrical switch means being mounted on the said control panel.

5. In a machine for grinding rotary pieces of work, the combination with means for supporting and revolving a work piece around its own axis, a grinding wheel, a wheel head in which said wheel is mounted for operation on the peripheral surface of the work piece so supported and revolved, the mounting for said wheel including an eccentric member supporting the wheel for oscillating movement about an axis parallel to the axis of the wheel, hydraulic mechanism for actuating the eccentric member, a turret adapted to hold a series of said work pieces, hydraulic mechanism for indexing said turret to present the work pieces successively to said means, hydraulic actuating mechanism for operating said work supporting and revolving means to cause it to engage and support the work pieces successively as they are presented to it by said turret, a single control apparatus for the said hydraulic mechanisms constructed and arranged to make them operate their respective units in the correct time relationship to each other, the said means for supporting and revolving a work piece around its own axis including a pair of spaced-apart chucks having adjustable collet portions adapted to open and close in response to its respective hydraulic actuating mechanism.

6. In a machine for grinding rotary pieces of work, the combination with means for supporting and revolving a work piece around its own axis, a grinding wheel, a wheel head in which said wheel is mounted for operation on the peripheral surface of the work piece so supported and revolved, the mounting for said wheel including an eccentric member supporting the wheel for oscillating movement about an axis parallel to the axis of the wheel, hydraulic mechanism for actuating the eccentric member, a turret adapted to hold a series of said work pieces, hydraulic mechanism for indexing said turret to present the work pieces successively to said means, hydraulic actuating mechanism for operating said work supporting and revolving means to cause it to engage and support the work pieces successively as they are presented to it by said turret, a single control apparatus for the said hydraulic mechanisms constructed and arranged to make them operate their respective units in the correct time relationship to each other, the hydraulic mechanism for actuating the eccentric member including a cylinder, a piston slidable in said cylinder, connections between said piston and the said eccentric member for transmitting motion of the piston to the eccentric member to oscillate it and thereby to swing said wheel to and from the work, the said hydraulic mechanism for the eccentric member further including a dashpot cylinder, a piston connected with said eccentric member and slidable in the dashpot cylinder, and a valve structure connecting said cylinders together and affording a substantially free flow of fluid into the dashpot cylinder during the movement of the wheel head away from the work piece but constructed to restrict said flow out of the dashpot cylinder during the work approaching movement of said wheel.

7. In a machine for grinding rotary pieces of work, the combination of a grinding wheel, turret means for supporting work pieces in position to be engaged by the grinding wheel, head and tail stocks operative to grip opposite ends of a piece of work carried by the turret and revolving the piece of work about its axis while said wheel acts on the peripheral surface of the work piece, control means including independent electric motors connected with the respective head and tail stocks to drive them, said motors being of the direct current type, and current supplying means for said motors adjustable to vary the relative speeds of the motors so that they can be synchronized by the operator.

8. In a machine for grinding rotary pieces of work, the combination with chuck means for rotating and revolving a work piece around its own axis including head and tail stocks, means supporting the head and tail stocks in axial alignment with each other to grip opposite ends of a piece of work and revolve it around said axis, a pair of independent electric motors connected with the respective head and tail stocks to drive them, said motors being of the direct current type, independent current supplying means for said motors adjustable to vary the relative speeds of the motors so that they can be synchronized manually, hydraulic mechanism for moving the chuck means into and out of engagement with the workpiece, a grinding wheel, a wheel head in which said wheel is mounted for operation on the peripheral surface of the workpiece so supported and revolved, the mounting for said wheel including an eccentric member supporting the wheel for oscillating movement about an axis parallel to the axis of the wheel, hydraulic mechanism for actuating the eccentric member, and a single control apparatus for both of the said hydraulic mechanisms constructed and arranged to enable them to operate their respective units in the correct time relationship to each other.

WARREN F. FRASER.

References Cited in the file of this patent

UNITED STATES PATENTS

| Number | Name | Date |
|---|---|---|
| 1,916,916 | Booth | July 4, 1933 |
| 2,003,269 | Arter et al. | May 28, 1935 |
| 2,092,721 | Arter | Sept. 7, 1937 |
| 2,117,917 | Silven | May 17, 1938 |
| 2,436,561 | Flygare et al. | Feb. 24, 1948 |